US012132808B2

(12) United States Patent
Raman et al.

(10) Patent No.: US 12,132,808 B2
(45) Date of Patent: *Oct. 29, 2024

(54) USER INTERFACE FOR CONFIGURING DEVICE-SPECIFIC IOT APPLICATIONS

(71) Applicant: ARRIS Enterprises LLC, Suwanee, GA (US)

(72) Inventors: Dinesh Raman, Fremont, CA (US); Jari Malinen, Santa Clara, CA (US); Siby Mathew Tarigopla Pancras, San Jose, CA (US); Brajesh Kumar, Aligarh (IN)

(73) Assignee: Ruckus IP Holdings LLC, Claremont, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/587,210

(22) Filed: Jan. 28, 2022

(65) Prior Publication Data
US 2022/0159092 A1    May 19, 2022

Related U.S. Application Data

(63) Continuation of application No. 17/014,438, filed on Sep. 8, 2020, now Pat. No. 11,272,038.
(Continued)

(51) Int. Cl.
*G06F 15/16* (2006.01)
*G16Y 20/30* (2020.01)
(Continued)

(52) U.S. Cl.
CPC .............. *H04L 67/75* (2022.05); *G16Y 20/30* (2020.01); *G16Y 30/10* (2020.01);
(Continued)

(58) Field of Classification Search
CPC . H04L 67/75; H04L 41/0813; H04L 41/5054; H04L 67/125; H04L 41/0894;
(Continued)

(56) References Cited

U.S. PATENT DOCUMENTS

| 6,473,794 B1 | 10/2002 | Guheen |
| 7,937,470 B2 | 5/2011 | Curley |

(Continued)

FOREIGN PATENT DOCUMENTS

| DE | 112017006701 T5 * | 9/2019 | ......... G06F 16/1824 |
| WO | 2018126077 A1 | 7/2018 | |

OTHER PUBLICATIONS

International Search Report and the Written Opinion of the International Searching Authority corresponding to International Patent Application No. PCT/US2020/047941 (14 pages) (mailed Nov. 30, 2020).

*Primary Examiner* — Ario Etienne
*Assistant Examiner* — Thorne E Waugh
(74) *Attorney, Agent, or Firm* — Steven Supp

(57) ABSTRACT

An electronic device that generates an electronic-device-specific application is described. During operation, the electronic device may receive a request to create the electronic-device-specific application, where the electronic-device-specific application is associated with a services manager in a system hierarchy. In response to the request, the electronic device may provide instructions for a user interface, wherein the user interface is configured to present predefined configuration alternatives for configuration parameters for the electronic-device-specific application and/or to receive inputs for the configuration parameters for the electronic-device-specific application. Then, the electronic device may receive user-interface activity information, which specifies selections of the configuration parameters for the electronic-device-specific application, where the configuration param-
(Continued)

eters for the electronic-device-specific application specify functions in a physical layer, a data link layer and a network layer in the electronic-device-specific application. Next, the electronic device may generate, based at least in part on the configuration parameters, the electronic-device-specific application.

20 Claims, 12 Drawing Sheets

Related U.S. Application Data

(60) Provisional application No. 62/898,275, filed on Sep. 10, 2019.

(51) Int. Cl.
*G16Y 30/10* (2020.01)
*H04L 41/0813* (2022.01)
*H04L 41/5054* (2022.01)
*H04L 67/125* (2022.01)
*H04L 67/75* (2022.01)
*G16Y 10/45* (2020.01)

(52) U.S. Cl.
CPC ...... *H04L 41/0813* (2013.01); *H04L 41/5054* (2013.01); *H04L 67/125* (2013.01); *G16Y 10/45* (2020.01)

(58) Field of Classification Search
CPC ... H04L 41/0895; H04L 67/12; H04L 41/084; H04L 41/0896; H04L 41/142; H04L 41/16; H04L 41/5009; H04L 41/5051; H04L 41/0806; G16Y 20/30; G16Y 30/10; G16Y 10/45
See application file for complete search history.

(56) References Cited

U.S. PATENT DOCUMENTS

| | | | |
|---|---|---|---|
| 9,923,918 B2 | 3/2018 | Nicodemus | |
| 9,930,514 B2 | 3/2018 | Conn | |
| 10,773,124 B2* | 9/2020 | Krueger | G09B 7/00 |
| 10,966,188 B2* | 3/2021 | Chang | H04L 67/12 |
| 10,973,014 B2* | 4/2021 | Chang | H04L 5/0055 |
| 11,025,556 B2* | 6/2021 | Sukoff | H04L 67/14 |
| 11,153,159 B2* | 10/2021 | Jain | H04L 41/0853 |
| 11,316,738 B2* | 4/2022 | Pianigiani | H04L 41/082 |
| 11,522,716 B2* | 12/2022 | Zinder | H04L 63/123 |
| 11,550,603 B2* | 1/2023 | Sulcer | H04L 41/5051 |
| 11,564,074 B2* | 1/2023 | Kumar | H04L 12/4633 |
| 2016/0105371 A1 | 4/2016 | Choi et al. | |
| 2017/0006460 A1 | 1/2017 | Conn | |
| 2017/0034116 A1* | 2/2017 | Cheng | H04L 67/12 |
| 2017/0351504 A1 | 12/2017 | Riedl | |
| 2018/0081743 A1* | 3/2018 | Mowatt | G06F 8/71 |
| 2018/0143825 A1* | 5/2018 | Noens | G06F 8/60 |
| 2018/0309786 A1* | 10/2018 | Apelewicz | H04W 12/04 |
| 2019/0020975 A1 | 1/2019 | Chhabra | |
| 2019/0158569 A1* | 5/2019 | Singleton, IV | H04L 67/75 |
| 2019/0349254 A1* | 11/2019 | Nolan | G06F 16/1824 |
| 2020/0112479 A1* | 4/2020 | Jain | G16H 40/20 |
| 2020/0296186 A1* | 9/2020 | Lau | H04L 67/75 |
| 2021/0075618 A1 | 3/2021 | Stephenson | |
| 2021/0111976 A1* | 4/2021 | Arellanes | H04L 67/01 |

* cited by examiner

USER INTERFACE FOR CONFIGURING DEVICE-SPECIFIC IOT APPLICATIONS

CROSS REFERENCE TO RELATED APPLICATIONS

This application is a continuation of U.S. Non-Provisional application Ser. No. 17/014,438, "User Interface for Configuring Device-Specific IoT Applications," by Dinesh Raman et al., filed on Sep. 8, 2020, the contents of which are herein incorporated by reference.

This application claims priority under 35 U.S.C. 119(e) to: U.S. Provisional Application Ser. No. 62/898,275, "User Interface for Configuring Device-Specific IoT Applications," filed on Sep. 10, 2019, by Dinesh Raman, et al., the contents of which are herein incorporated by reference.

FIELD

The described embodiments relate to techniques for specifying configuration parameters. Notably, the described embodiments relate to techniques for specifying configuration parameters for an electronic-device-specific Internet-of-things (IoT) application.

BACKGROUND

The increasing capabilities of electronic devices are dramatically changing our lives. For example, the processing and communication capabilities of portable electronic devices, such as cellular telephones, provide users with the capabilities of a handheld computer. In conjunction with expanded networks, such as the cellular-telephone networks and the Internet, these capabilities are allowing individuals to: access vast amounts of information; identify and interact with other people, organizations and governments; access information at arbitrary locations; and/or perform a wide variety of tasks. Collectively, these technologies have resulted in a significant increase in economic activity (such as online financial transactions, which are sometimes referred to as 'ecommerce') and productivity, and enable a host of applications that enhance user experiences and quality of life.

Recently, it has been proposed that further advances can be achieved by enhancing the capabilities of other electronic devices, which are pervasive but largely ignored by most users (such as in appliances, infrastructure, transportation, farming, etc.). Notably, by embedding sensors, actuators and communication capabilities in these 'background' electronic devices, the so-called 'Internet of things' (IoT) can provide a distributed network that facilities the exchange of data, remote sensing and control, and a diverse set of applications that facilitate more direct integration of the physical world into computer-based systems. In principle, the IoT offers the promise of highly automated systems that improve efficiency, enhance accuracy and expand economic activity in a diverse set of markets, such as: smart cities, hospitality, retail, education, housing, and manufacturing.

In practice, there are still obstacles to achieving the goals of the IoT. Notably, the IoT marketplace is diverse, with competing commercial entities offering devices/endpoints, networks, middleware and cloud-based platforms and services. Moreover, the marketplace lacks interoperability standards, which restricts communication and the exchange of data among components in these systems. The resulting lack of coordination can make it difficult to scale IoT systems while maintaining or ensuring quality of service.

Consequently, the IoT remains fragmented and siloed, which forces users to purchase additional dedicated equipment (such as separate gateways for electronic devices from different manufacturers and providers, and/or additional network switches to connect to different cloud-based service providers) in an attempt to build integrated solutions. However, these efforts often result in custom and expensive solutions with redundant equipment and limited flexibility, all of which is frustrating to users and limits market traction of the IoT.

SUMMARY

An electronic device that provides instructions for a user interface to configure parameters for an electronic-device-specific application associated with a services manager in a system hierarchy is described. This electronic device includes: a network node; an interface circuit that is communicatively coupled to the network node; a processor; and memory that stores program instructions, where, when the executed by the processor, the program instructions cause the electronic device to perform one or more operations. Notably, during operation, the electronic device may receive, at the interface circuit, a request, associated with a second electronic device, to create the electronic-device-specific application. In response to the request, the electronic device may provide, from the interface circuit, the instructions for the user interface addressed to the second electronic device, where the user interface is configured to present predefined configuration alternatives for the configuration parameters for the electronic-device-specific application and/or to receive inputs for the configuration parameters for the electronic-device-specific application. Then, the electronic device may receive, at the interface circuit, user-interface activity information associated with the second electronic device, which specifies selections of the configuration parameters for the electronic-device-specific application from the predefined configuration alternatives and/or the inputs for the configuration parameters for the electronic-device-specific application. Moreover, based at least in part on the configuration parameters for the electronic-device-specific application, the electronic device may generate the electronic-device-specific application.

The services manager in the system hierarchy may be between a computer associated with a provider of a third electronic device (such as an IoT device) and a gateway (such as an access point or an eNodeB) that communicates with the third electronic device. For example, the electronic device may provide, from the interface circuit, the electronic-device-specific application addressed to the services manager, where the services manager manages one or more different electronic devices (such as the third electronic device) associated with one or more different providers, and establishes communication between one or more third electronic devices (e.g., via the gateway) and one or more computers associated with the one or more providers (such as cloud-based computers). Note that the electronic-device-specific application may execute in a provider-specific or an electronic-device-specific environment in the services manager. For example, the provider-specific or the electronic-device-specific environment may include a virtual operating system in a container in the services manager, and the electronic-device-specific application may be a plugin that executes in the container. Moreover, the electronic-device-specific application may be defined by the available system resources, and may be mapped to pools matching the service-level-agreement requested from the configurator (such as a user or an operator) for a given container. A definition may configure the system resources used by the given container to match the requirements needed to satisfy a service level agreement, such as maximum packet latency under traffic of up to a specified number of packets per second, while satisfying, at the same time, the availability of the system resources in the underlying system so that it does not exceed the system resources of the underlying system that are shared by multiple containers.

Additionally, the predefined configuration alternatives for the configuration parameters for the electronic-device-specific application and/or the inputs for the configuration parameters for the electronic-device-specific application may include communication information, authentication information and/or security information. For example, the predefined configuration alternatives for the configuration parameters for the electronic-device-specific application and/or the inputs for the configuration parameters for the electronic-device-specific application may include: registration information, a message format, a receive communication protocol for the electronic device, a transmit communication protocol for the electronic device, authentication information, and/or security information. Thus, the configuration parameters for the electronic-device-specific application may specify functions of the electronic-device-specific application at different layers in an Open System Interconnection (OSI) model, including at least a physical layer, a data link layer and a network layer.

Note that the electronic-device-specific application may be used for the third electronic device, a type of third electronic device or a class of third electronic devices that includes the third electronic device.

In some embodiments, the electronic device may receive, at the interface circuit, performance information (and, more generally, feedback) associated with operation of the electronic-device-specific application in at least a portion of the system hierarchy. Based at least in part on the performance information, the electronic device may (e.g., automatically or without human action) modify the configuration parameters for the electronic-device-specific application and may (e.g., automatically or without human action) regenerate the electronic-device-specific application. Moreover, the electronic device may modify the configuration parameters for the electronic-device-specific application based at least on predefined or predetermined electronic-device-specific information, e.g., information stored in a profile of the third electronic device, which includes attributes or characteristics of the third electronic device.

Furthermore, the configuration parameters for the electronic-device-specific application may be associated with different system resources (such as computational resources, memory, and/or network resources) or priorities in the services manager and/or the system hierarchy. For example, the electronic device may determine the system resources based at least in part on the configuration parameters for the electronic-device-specific application and/or a priority associated with the electronic-device-specific application. In some embodiments, the electronic device may generate a service level agreement for a provider of the third electronic device based at least in part on the configuration parameters for the electronic-device-specific application, where the service level agreement specifies system resources corresponding to the configuration parameters for the electronic-device-specific application, performance of the electronic-device-specific application, and/or associated compensation for an operator of the services manager.

For example, the system resources may include distributing a finite set of time slots to a set of services and denying the addition of extra services when the set of time slots is exhausted. This approach may prioritize the service level agreement of a service by granting more time slots to a service with a higher service level agreement.

In some embodiments, the electronic device may provide feedback to an operator or a user if a set of parameters given cannot be satisfied by the electronic device, for example, if a finite resource needed for achieving a requested service level agreement and distributed to one or more applications has been exhausted.

Another embodiment provides the services manager in one or more of the preceding embodiments. For example, the services manager may include: a network node; an interface circuit that is communicatively coupled to the network node, and that communicates with one or more second electronic devices via one or more gateways and one or more computers associated with different providers; a processor; and memory that stores program instructions, where, when the executed by the processor, the program instructions cause the services manager to perform one or more operations. Notably, during operation, the services manager may establish one or more separate containers with virtual environments for one or more electronic-device-specific applications. Then, the services manager may execute the one or more electronic-device-specific applications in the corresponding one or more containers, wherein a given electronic-device-specific application executes in a given container and is associated with a given second electronic device in the one or more second electronic devices and is associated with a given computer in the one or more computers.

Another embodiment provides an access point or an eNodeB that performs counterpart operations to those performed by the services manager in one or more of the preceding embodiments.

Another embodiment provides a computer-readable storage medium with program instructions for use with the electronic device or the services manager. When executed by the electronic device or the services manager, the program instructions cause the electronic device or the services manager to perform at least some of the aforementioned operations in one or more of the preceding embodiments.

Another embodiment provides a method, which may be performed by the electronic device or the services manager. This method includes at least some of the aforementioned operations in one or more of the preceding embodiments.

This Summary is provided for purposes of illustrating some exemplary embodiments, so as to provide a basic understanding of some aspects of the subject matter described herein. Accordingly, it will be appreciated that the above-described features are examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

Figure 1:
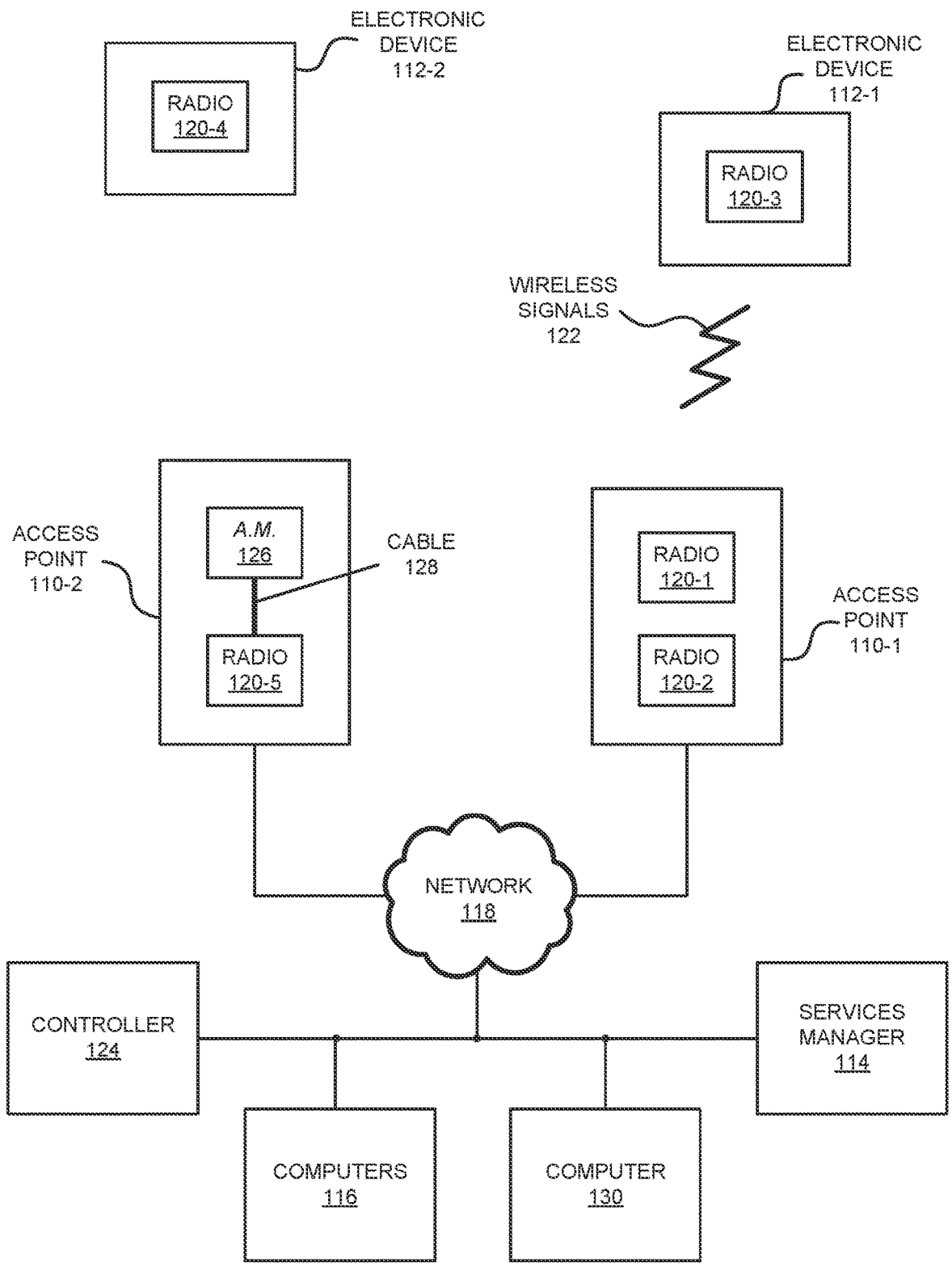
FIG. 1 is a block diagram illustrating an example of communication among electronic devices in accordance with an embodiment of the present disclosure.

An electronic device that generates an electronic-device-specific application is described. During operation, the electronic device may receive a request to create the electronic-device-specific application, where the electronic-device-specific application is associated with a services manager in a system hierarchy. In response to the request, the electronic device may provide instructions for a user interface, wherein the user interface is configured to present predefined configuration alternatives for configuration parameters for the electronic-device-specific application and/or to receive inputs for the configuration parameters for the electronic-device-specific application. Then, the electronic device may receive user-interface activity information, which specifies selections of the configuration parameters for the electronic-device-specific application, where the configuration parameters for the electronic-device-specific application specify functions in a physical layer, a data link layer and a network layer in the electronic-device-specific application. Next, the electronic device may generate, based at least in part on the configuration parameters for the electronic-device-specific application, the electronic-device-specific application.

By allowing users to flexibly specify the configuration parameters, the configuration techniques may allow a flexible and scalable solution for generating electronic-device-specific applications. Notably, this capability may allow multiple, different providers of third electronic devices (such as IoT devices) to specify configurations parameters for associated electronic-device-specific applications, which may simplify the onboarding process for these providers and their associated third electronic devices. In this way, the services manager may be able to provide services to a wide variety of third electronic devices. Consequently, the configuration techniques may address the fragmentation of the existing IoT marketplace, which may the reduce cost and complexity of integrating the third electronic devices. Therefore, the configuration techniques may facilitate improved services, which may improve the user experience and may enable the IoT.

In the discussion that follows, electronic devices (such as an access point or an eNodeB) communicate frames or packets in accordance with one or more wireless communication protocol, such as an Institute of Electrical and Electronics Engineers (IEEE) 802.11 standard (which is sometimes referred to as 'Wi-Fi,' from the Wi-Fi Alliance of Austin, Texas), Bluetooth (from the Bluetooth Special Interest Group of Kirkland, Washington), BLE (from the Bluetooth Special interest Group of Kirkland, Washington), Zigbee (from the Zigbee Alliance of Davis, California), Z-Wave (from Sigma Designs, Inc. of Fremont, California), LoRaWAN (from the Lora Alliance of Beaverton, Oregon), Thread (from the Thread Group of San Ramon, California), IPv6 over low-power wireless personal area networks or 6LoWPAN (from the Internet Engineering Taskforce of Fremont, California) and/or another type of wireless interface. In the discussion that follows, Zigbee and BLE are used as illustrative examples. However, a wide variety of communication protocols (such as Long Term Evolution or LTE, another cellular-telephone communication protocol, etc.) may be used.

Moreover, the access point or eNodeB may communicate with other access points, eNobdeBs and/or computers in a network using a wired communication protocol, such as an IEEE 802.3 standard (which is sometimes referred to as 'Ethernet'), Message Queueing Telemetry Transport (MQTT) and/or another type of wired interface. In the discussion that follows, MQTT and Ethernet are used as illustrative examples.

FIG. 1 presents a block diagram illustrating an example of communication among one or more access points 110, one or more electronic devices 112 (such as a cellular telephone), a services manager 114, and one or more computers 116 associated with service providers (or third parties, which are sometimes referred to as 'providers') in accordance with some embodiments. Notably, access points 110 may communicate with each other and other components in FIG. 1 using wireless and/or wired communication. Note that access points 110 may include a physical access point and/or a virtual access point that is implemented in software in an environment of an electronic device or a computer. Furthermore, at least some of access points 110 may communicate with electronic devices 112 using wireless communication.

The wired communication among access points 110 and other components (such as services manager 114) may occur via network 118 (such as an intra-net, a mesh network, point-to-point connections and/or the Internet) and may use a network communication protocol, such as Ethernet or MQTT. Moreover, the wireless communication using Wi-Fi or another wireless communication protocol (such as BLE or Zigbee) may involve: transmitting advertising frames on wireless channels, detecting one another by scanning wireless channels, establishing connections (for example, by transmitting association or attach requests), and/or transmitting and receiving packets or frames (which may include the association requests and/or additional information as payloads). In some embodiments, wireless communication by access points 110 also involves the use of dedicated connections, such as via a peer-to-peer (P2P) communication techniques.

Figure 12:
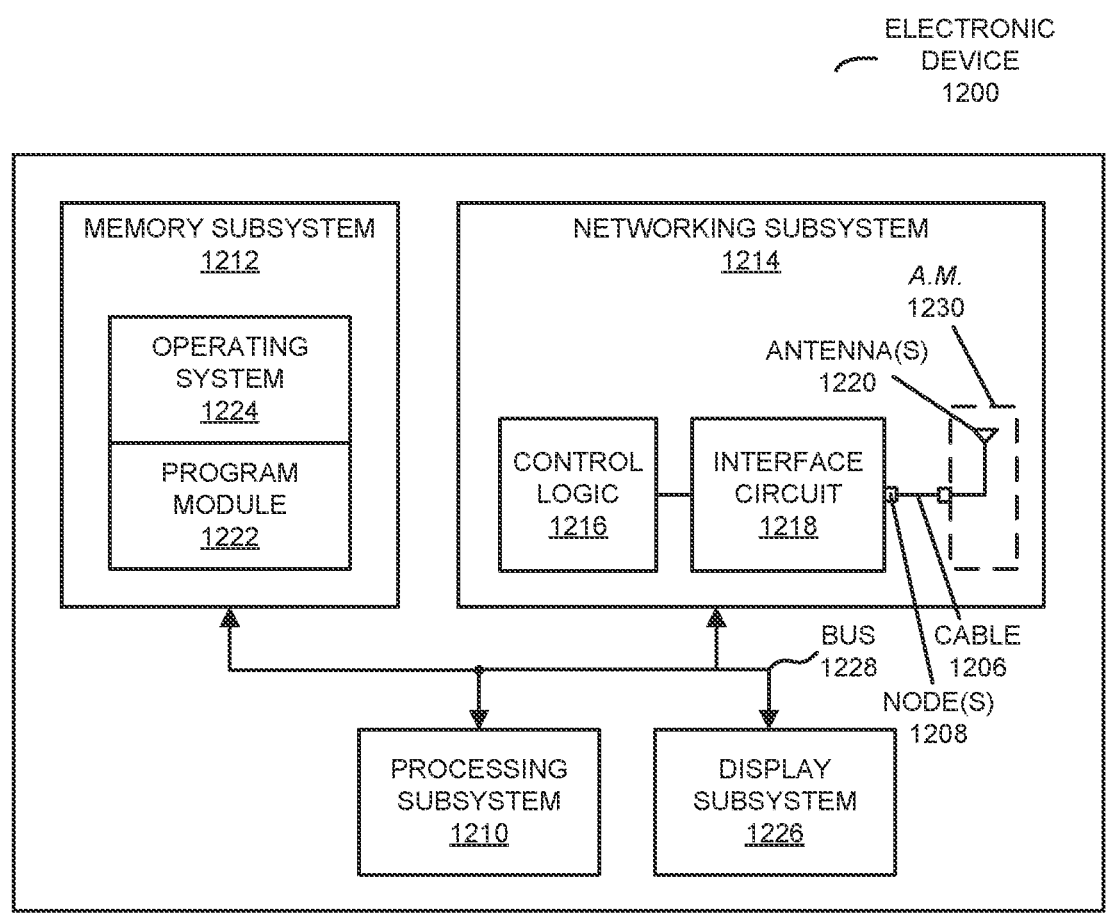
FIG. 12 is a block diagram illustrating an example of an electronic device in accordance with an embodiment of the present disclosure.

As described further below with reference to FIG. 12, access points 110, electronic devices 112, services manager 114 and/or computers 116 may include subsystems, such as a networking subsystem, a memory subsystem and a processor subsystem. In addition, access points 110 and electronic devices 112 may include radios 120 in the networking subsystems. More generally, access points 110 and electronic devices 112 can include (or can be included within) any electronic devices with the networking subsystems that enable access points 110 and electronic devices 112 to communicate with each other using wireless and/or wired communication. This wireless communication can comprise transmitting advertisements on wireless channels to enable access points 110 and/or electronic devices 112 to make initial contact or detect each other, followed by exchanging subsequent data/management frames (such as association requests and responses) to establish a connection, configure security options (e.g., Internet Protocol Security), transmit and receive packets or frames via the connection, etc. Note that while instances of radios 120 are shown in access points 110 and electronic devices 112, one or more of these instances may be different from the other instances of radios 120. In some embodiments, such as in access point 110-2, radio 120-5 is coupled to a separate antenna module (A.M.) 126 by a cable 128.

As can be seen in FIG. 1, wireless signals 122 (represented by a jagged line) are transmitted from radios 120-1 and/or 120-2 in access point 110-1. These wireless signals may be received by radio 120-3 in electronic device 112-1. Notably, access point 110-1 may transmit frames or packets. In turn, these frames or packets may be received by electronic device 112-1. Moreover, access point 110-1 may allow electronic device 112-1 to communicate with other electronic devices, computers and/or servers via network 118.

Note that the communication between at least pairs of components in FIG. 1 may be characterized by a variety of performance metrics, such as: a received signal strength (RSSI), a data rate, a data rate for successful communication (which is sometimes referred to as a 'throughput'), an error rate (such as a retry or resend rate), a mean-square error of equalized signals relative to an equalization target, intersymbol interference, multipath interference, a signal-to-noise ratio, a width of an eye pattern, a ratio of number of bytes successfully communicated during a time interval (such as 1-10 s) to an estimated maximum number of bytes that can be communicated in the time interval (the latter of which is sometimes referred to as the 'capacity' of a communication channel or link), and/or a ratio of an actual data rate to an estimated data rate (which is sometimes referred to as 'utilization').

In the described embodiments processing a packet or frame in access points 110 and electronic devices 112 includes: receiving wireless signals 122 with the packet or frame; decoding/extracting the packet or frame from received wireless signals 122 to acquire the packet or frame; and processing the packet or frame to determine information contained in the packet or frame.

Although we describe the network environment shown in FIG. 1 as an example, in alternative embodiments, different numbers or types of electronic devices may be present. For example, some embodiments comprise more or fewer electronic devices. As another example, in another embodiment, different electronic devices are transmitting and/or receiving packets or frames.

As noted previously and as described further below with reference to FIG. 2, one of access points 110 (such as access point 110-1) may perform at least some aspects of the communication or configuration techniques. This may allow access points 110 to become one-touch points of access to the IoT using a single framework. Notably, access points 110 may facilitate the dynamic integration of multiple electronic devices and service providers in a variety of applications, as well as easy deployment and upgrades.

In some embodiments, access point 110-1 may provide co-existing or concurrent communication using different communication protocols. Notably, access point 110-1 may include radio 120-1 and/or 120-2. These radios may, respectively, communicate using different communication protocols in a shared band of frequencies (such as the 2.4 GHz ISM band of frequencies). For example, radio 120-1 may be a BLE radio and radio 120-2 may be a Wi-Fi radio (or vice versa). During operation, radio 120-2 may perform a scan of available channels in the shared band of frequencies. Radio 120-2 may detect or determine that BLE and Wi-Fi may each use one of primary channels 1, 6 and 11 (such as channel 1). Alternatively, radio 120-2 may receive, from radio 120-1 (if access point 110-1 includes radio 120-1), information specifying one or more used channels in the shared band of frequencies that are reserved or used by the BLE communication protocol. Next, radio 120-2 may mask the one or more used channels from the available channels (such as by masking out 8-16 MHz corresponding to primary channel 1), and radio 120-2 may select one or more channels from remaining available channels for use with the Wi-Fi communication protocol, such as a new primary channel. Thus, because Wi-Fi has the ability to hop among different channels while BLE and Zigbee typically do not hop, channel masking may be used to facilitate co-existing and/or concurrent communication among access points 110 and electronic devices 112 using two different communication protocols in the shared band of frequencies.

While access point 110-1 is illustrated with separate radios 120-1 and 120-2, in some embodiments these radios are combined into a single radio or integrated circuit. Alternatively or additionally, packet-traffic arbitration between radios 120-i and 120-2 may be used. Notably, when one of the radios is transmitting or receiving using a channel and a first communication protocol, it may communicate a hold (such as a hold signal or instruction) to the other radio, so that the other radio temporarily does not communicate using the channel and a second communication protocol.

In some embodiments, additional communication capability is added to access point 110-1 via a plug-in module, such as a dongle (which is sometimes referred to as a 'USB dongle') that is inserted int© a USB port in access point 110-1. For example, radio 120-1 may be a USB dongle that adds BLE communication capability to access point 110-1. In conjunction with software on access point 110-1, this may enable communication-protocol recognition and translation, as well as communication via another communication protocol (as was just described).

Moreover, as described further below with reference to FIGS. 3 and 4, additional infrastructure may perform or implement at least some aspects of the communication or configuration techniques. Notably, services manager 114 may enable dynamic integrated solutions with disparate (and otherwise potentially incompatible) components, such as one or more sensors (which are sometimes referred to as an 'IoT device') and/or actuators from different manufacturers (which are sometimes referred to as an 'IoT device'), and/or one or more service providers. These different components may be associated with different (unrelated) entities, such as different companies or organizations. Note that in the present discussion an 'IoT device' may have a sensing capability and/or an actuation capability.

Notably, services manager 114 may include: a gateway that communicates with one or more of access point 110 via a communication protocol (such as MQTT); a control and management plane with system-configuration information; and a data plane with a registry of the one or more electronic devices 112, rules for the one or more electronic devices 112, and application programming interfaces (APIs) for service providers. Services manager 114 may provide a programmable, modular and integrated system for flexibly and securely exchanging data and associated services among access points 110, electronic devices 112, services manager 114 and computers 116. Note that resources in services manager 114 that are associated with different service providers may be contained in separate virtual machines. Alternatively or additionally, the resources from different service providers may be included in 'containers' (such as docker containers). Furthermore, the control and management plane and the data plane may be implemented in separate software stacks in services manager 114.

In some embodiments, optional controller 124 is used to configure settings of access points 110, such as transmit power, a transmit antenna pattern, a receive antenna pattern, etc. Thus, controller 124 may provide Wi-Fi control and management planes. Moreover, controller 124 may initialize IoT services that are facilitated and managed by services manager 114, i.e., services manager 114 may provide IoT data plane and control and management plane. In addition, services manager 114 may provide a partner portal for Wi-Fi and IoT management by one or more of computers 116. Note that in some embodiments, controller 124 may be combined with services manager 114 in a single device. Furthermore, note that controller 124 and/or services manager 114 may be local devices where access points 110 and electronic devices 112 are installed and used, or may be at a remote location (such as a cloud-based implementation).

In these ways, the communication or configuration techniques may enable the IoT. Notably, access points 110 and services manager 114 may provide a single-access network for and IoT traffic. Access points 110 and services manager 114 may: manage network across different physical layers, provide IoT device-to-backend management, and/or distributed decision-making (such as at the edge immediately behind a firewall versus backend processing). Moreover, access points 110 and services manager 114 may be: transport protocol agnostic, architecture agnostic to the transport layer, and/or may support a variety of communication or transport protocols, such as Zigbee, BLE and/or other IoT communication protocols. Furthermore, access points 110 and services manager 114 may: provide a network backbone for a variety of services, enable end-to-end services for multiple connected ecosystems, and/or provide end-to-end solutions with a simplified value chain and a single network.

Moreover, the communication or configuration techniques may allow access points 110 and/or services manager 114 to provide flexible and secure exchange of data and the associated services. For example, the communication or configuration techniques may remove siloes between components from different manufacturers and providers (such as local electronic devices that provide sensing capabilities and actuators and service providers), and may facilitate dynamic services for customers (such as services that are configured and provided as needed). Furthermore, services manager 114 may facilitate interoperability of disparate components from different manufacturers and providers without requiring a standard or retrofitting of legacy equipment. Additionally, services manager 114 may eliminate the need for additional (and expensive) dedicated equipment (such as separate gateways for electronic devices from different manufacturers and/or additional network switches to connect to different cloud-based service providers). Thus, services manager 114 may enable integrated solutions and the IoT, which may allow a wide variety of valued-added applications and services, enhanced economic activity and enhanced user experiences and customer satisfaction.

Furthermore, as described further below with reference to FIGS. 7-11, services manager 114 may provide a flexible and scalable solution for supporting (such as providing management for and/or communication with) multiple electronic devices 112 (via, e.g., access points 110) and computers 116 associated with service providers. Notably, because electronic devices 112 from different providers or manufacturers do not, in general, have a common communication standard, there often can not intemperate or communicate with each other. Consequently, in order to implement end-to-end services in the IoT, many service providers (who may be the same as or different from the providers or manufacturers of electronic devices 112) have proprietary gateways that convert IoT traffic into Ethernet-compatible traffic that can be communicated with computers 116. However, this approach leaves the marketplace fragmented, and is more expensive and complicated, which is frustrating to consumers.

In order to address this challenge, access points 110 may provide an integrated or aggregated gateway that can communicate with different electronic devices 112. In addition, services manager 114 may provide a modular framework to manage the different communication protocols implemented by access points 110 and to process the corresponding traffic that is communicated with computers 116.

Figure 7:
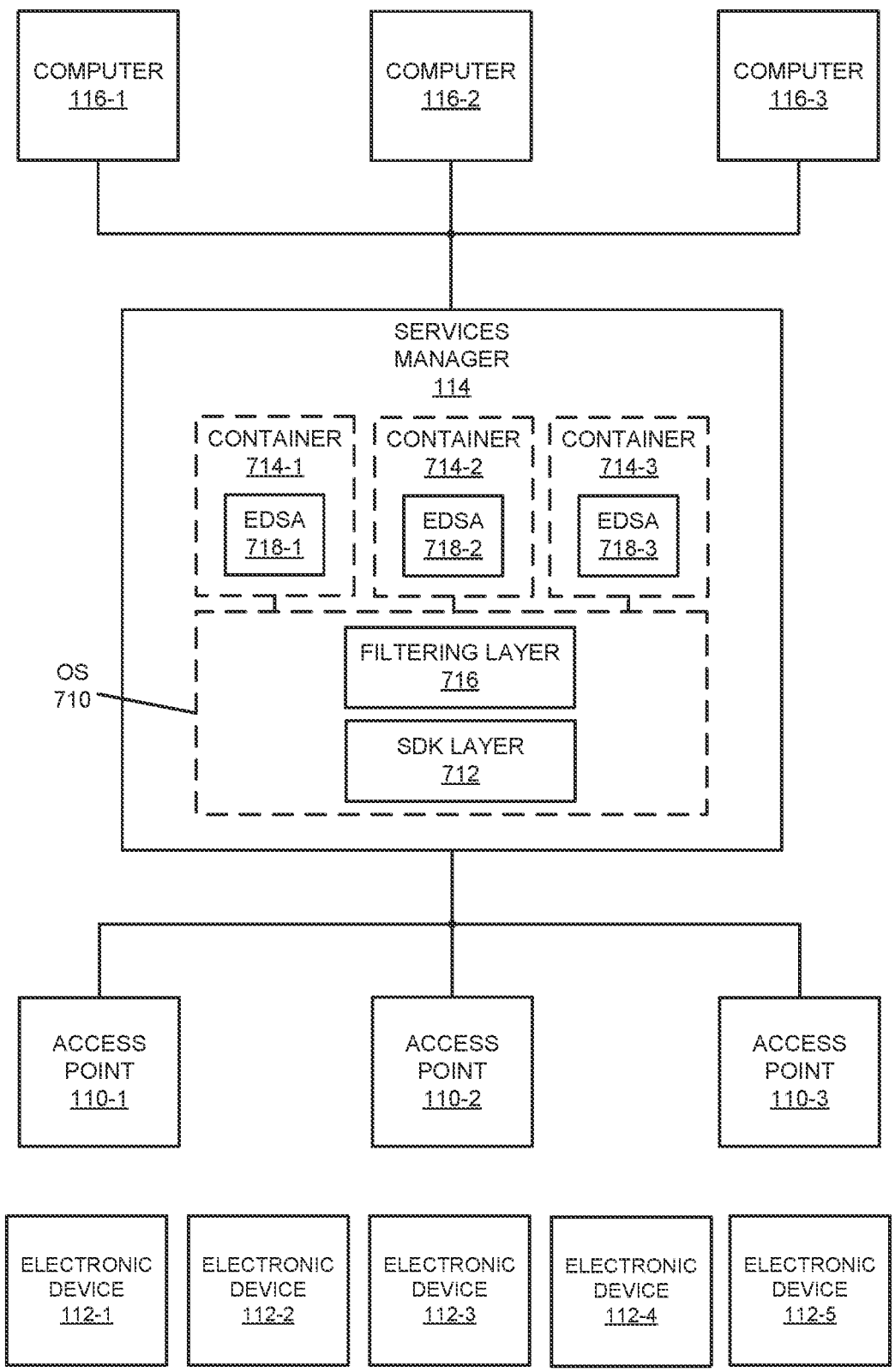
FIG. 7 is a drawing illustrating an example of a services manager in FIG. 1 in accordance with an embodiment of the present disclosure.

Notably, as shown in FIG. 7, which presents a drawing illustrating an example of a services manager 114 in accordance with an embodiment of the present disclosure, services manager 114 may communicate with different gateways in access points 110, which communicate using one or more (and, in general, different) communication protocols with electronic devices 112. For example, the communication protocols may include: the Internet Protocol, Zigbee, BLE, LoraWAN, etc. The traffic may pass through a software development kit (SDK) layer 712 that is implemented in the runtime operating system (OS) 710 in services manager 114 (such as Linux) to appropriate (i.e., corresponding) containers 716 (which are sometimes referred to as 'plugin containers'). These containers may provide virtual environments (which may be separate and/or self-contained from operating system 710) for electronic-device-specific applications (EDEA) 718, which may be used to provide a service in conjunction with one or more of electronic devices 112, a type of electronic device and/or a class of electronic devices. For example, the virtual environments in containers 716 may be virtual machines that provide a micro-service for corresponding electronic devices 112 and that each may provide a separate and distinct execution environment for one of electronic-device-specific applications 718. In some embodiments, containers 716 may be implemented using one or more of: a Linux Container (LXC), a Docker container, a Kubernetes pod or container, or a cgroup.

Note that SDK layer 712 may include a filtering layer 714 that determines where the traffic associated with electronic devices 112 (which may be unidirectional or bidirectional) is routed. Moreover, the electronic-device-specific applications 718 may communicate traffic with corresponding computers 116 (e.g., via an application programming interface), which may allow service providers to manage and implement a wide variety of services based on electronic devices 112.

Figure 8:
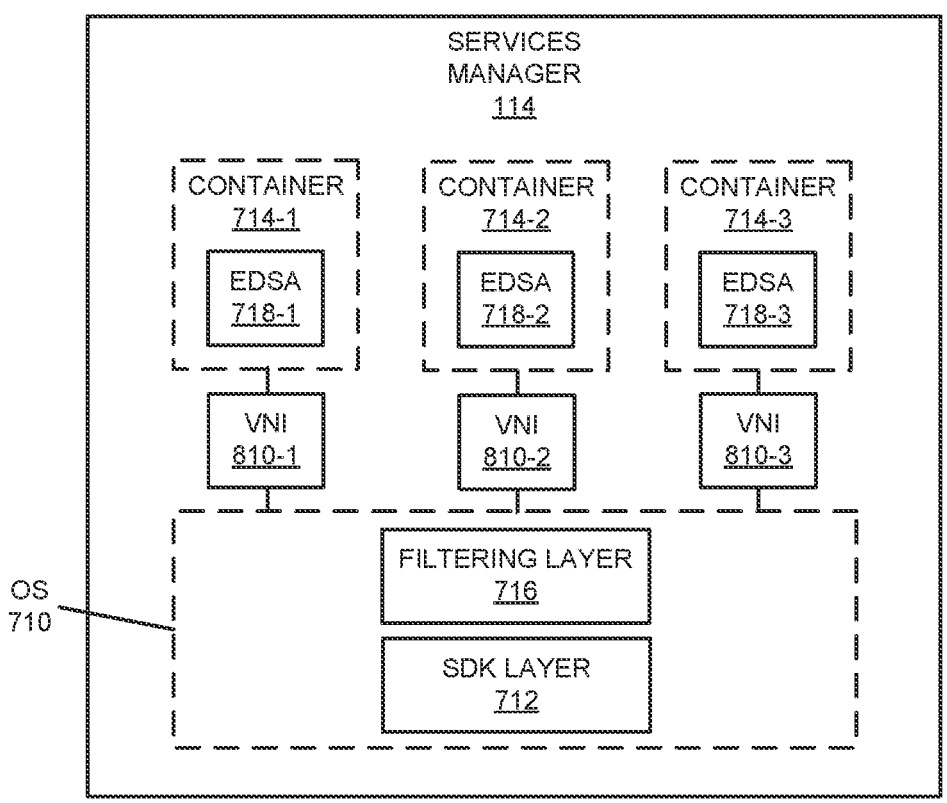
FIG. 8 is a drawing illustrating an example of a services manager in FIG. 1 in accordance with an embodiment of the present disclosure.

In some embodiments, services manager 114 includes a secure infrastructure that implements security. This is shown in FIG. 8, which presents a drawing illustrating an example of services manager 114 in accordance with an embodiment of the present disclosure. Notably, a container (such as container 716-1) may or may not be able to communicate with one or more other containers 716. In addition, containers 716 may communicate with operating system 710 via a virtual network interfaces (VNIs) 810 that provide filtering and security. For example, virtual network interface 810-1 may provide port-based access to container 716-1 (such as via port 80, 880 and/or 403). Alternatively or additionally, the filtering may be exclusive for electronic-device-specific application 718-1 in container 716-1, such as based at least in part on one or more of: a communication protocol associated with electronic-device-specific application 718-1 (e.g., during communication with electronic device 112-1), a message type, etc.

Referring back to FIG. 7, a given one of electronic-device-specific applications 718 may define or specify communication protocols, authentication and/or security for gateways in one or more access points 110, one or more electronic devices 112 and one or more of computers 116. For example, the electronic-device-specific applications 718 may provide one or more functions, such as: registration procedure (e.g., a universal unique identifier, a message format, a receive communication protocol, a send communication protocol, etc.), a receive callback procedure (e.g., cloud-based or local authentication, business logic, etc.), a send callback procedure (e.g., unicast or broadcast communication), and/or a close procedure (which can be used to deregister or discontinue service for a given one of the electronic-device-specific applications 718).

Thus, the electronic-device-specific applications 718 may provide an on-premises management system in services manager 114. The containers 716 may reduce or eliminate problems, such as: denial of service, or an error in one of the electronic-device-specific applications 718 causing services manager 114 to crash). Moreover, the separation of the electronic-device-specific applications 718 may allow services manager 114 to define service level agreements with the service providers, which may allow services manager 114 to apportion system resources (such as processing, memory, network bandwidth, etc.) to the electronic-device-specific applications 718 in order to achieve a desired communication performance (such as latency, throughput, capacity, etc.) and/or traffic priority (such as for a panic button, a smoke detector or a fire alarm, a carbon monoxide detector, a camera, a door lock, a light switch, a motion detector, and/or a burglar alarm). In some embodiments, the service level agreements may include different tiers (with different system resources, communication performance, priorities, etc.) and associated price points or compensation for a provider of services manager 114.

However, because of the wide variety of electronic devices 112 in the marketplace, it can be time-consuming and expensive to develop or implement the electronic-device-specific applications 718. In order to avoid this bottleneck (and, thus, in order to allow services manager 114 to be rapidly scaled to support the wide variety of electronic devices 112 and the dynamic marketplace), a provider of services manager 114 may offer a portal or user interface (such as an application programming interface) that users can use to define or specify configuration parameters for a given one of electronic-device-specific applications 718. This capability, which is described further below with reference to FIGS. 9-11, may allow the electronic-device-specific applications 718 to be rapidly and flexibly created based on instructions from the services providers and/or the providers or manufacturers of electronic devices 112. Then, once the given one of electronic-device-specific applications 718 is generated, it may be implemented in one of containers 716 on services manager 114, so that a new service can be offered.

While the communication or configuration techniques in FIG. 1 are illustrated using access points 110 and services manager 114, in other embodiments at least some of the access points 110 may be eNodeBs (not shown). Moreover, an eNodeB may communicate with at least one of access points 110, e.g., using an LTE-WLAN aggregation (LWA) communication protocol.

We now further describe embodiments of access points 110 and services manager 114. Current IoT-device gateways often operate within closed proprietary ecosystems, which can make it difficult to integrate a wide array of management platforms and disparate IoT-device networks. These problems are typically compounded by architectural limitations. For example, the gateways may have monolithic non-modular architectures that often are not scalable and customizable for different IoT-device network deployment scenarios, and these gateways are usually tied to expensive purpose-built hardware.

In order to address these challenges, access points 110 may aggregate and disburse data across disparate IoT devices, and may include data-acquisition and data transformation capabilities (such as a data acquisition and transformation engine or control logic). In addition, services manager 114 may include: a gateway abstraction service, an internal software development kit (SDK) that allows management of a control and management plane, and/or a partner services SDK that allows partner services providers to manage contained resources in services manager 114 that are associated with the respective partner services providers. Note that communication between services manager 114 and access points 110 may use a communication protocol, such as MQTT.

Figure 2:
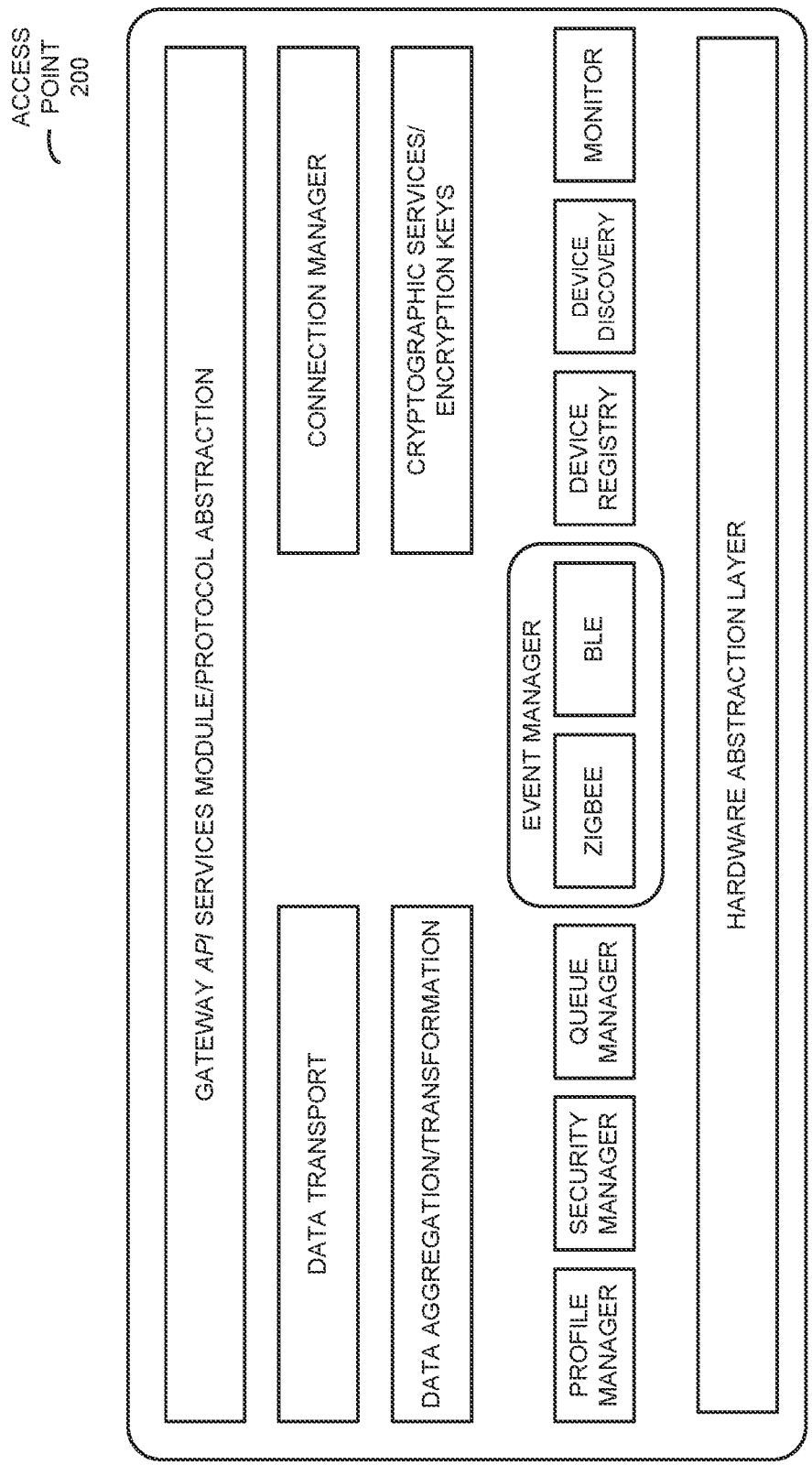
FIG. 2 is a drawing illustrating an example of functionality of an access point in FIG. 1 in accordance with an embodiment of the present disclosure.

FIG. 2 presents a drawing illustrating an example of functionality of an access point 200, such as access point 110-1 in FIG. 1. Access point 200 may include an embedded IoT gateway and may provide an IoT-device management platform that is programmable and that can be easily integrated with existing management solutions. The core gateway functions in access point 200 may include: different communication-protocol stacks, a hardware for communication-protocol abstraction (which can provide a unified view of IoT devices to management platform), data acquisition (such as data aggregation and transformation), prioritization (data/traffic prioritization), management (which can access and set an electronic-device configuration), security (secure electronic-device authentication/actuation and cryptographic services, such as storing one or more encryption keys associated with particular electronic devices), data transport (such as MQTT), a connection manager and/or a gateway API services module and communication-protocol abstraction. In addition, access point 200 may include: an event manager core application (for different communication protocols, such as Zigbee or BLE), a profile manager for the different communication protocols, a security manager, a queue manager, an electronic-device registry, electronic-device discovery and/or a monitor that ensures safe and appropriate operation (such as by detecting an anomaly), and that tracks communication performance, etc.

In some embodiments, access point 200 may include a trusted secure element, WLAN firmware, an IoT gateway engine or control logic (such as one or more physical layer communication protocols) and an application layer that translates between different communication protocols. Note that a given access point may provide at least one communication protocol (in addition to Wi-Fi) via a USB dongle, and groups of access points may be interleaved to provide multiple different communication protocols.

After receiving information (such as IoT-device data or data traffic) from one or more of electronic devices 112 in FIG. 1, access point 200 may translate, into a unified format, the information associated with the one or more electronic devices 112, which may have been received by access point 200, at an interface circuit in access point 200, using different communication protocols. Then, access point 200 may send or communicate the translated information in a unified and consistent manner to a services manager, such as services manager 114 (FIG. 1). For example, access point 200 may provide, from an interface circuit in access point 200, the translated information for one or more additional electronic devices (such as services manager 114 in FIG. 1) using another communication protocol, such as MQTT.

In some embodiments, access point 200 (or services manager 114 in FIG. 1) may provide security by selectively including communication with an electronic device (such as electronic device 112-1 in FIG. 1) in an inclusion list and/or by selectively excluding communication with another electronic devices (such as electronic device 112-2 in FIG. 1) in an exclusion list. For example, the black and/or white lists may be applied by access point 200 following a scan.

Figure 3:
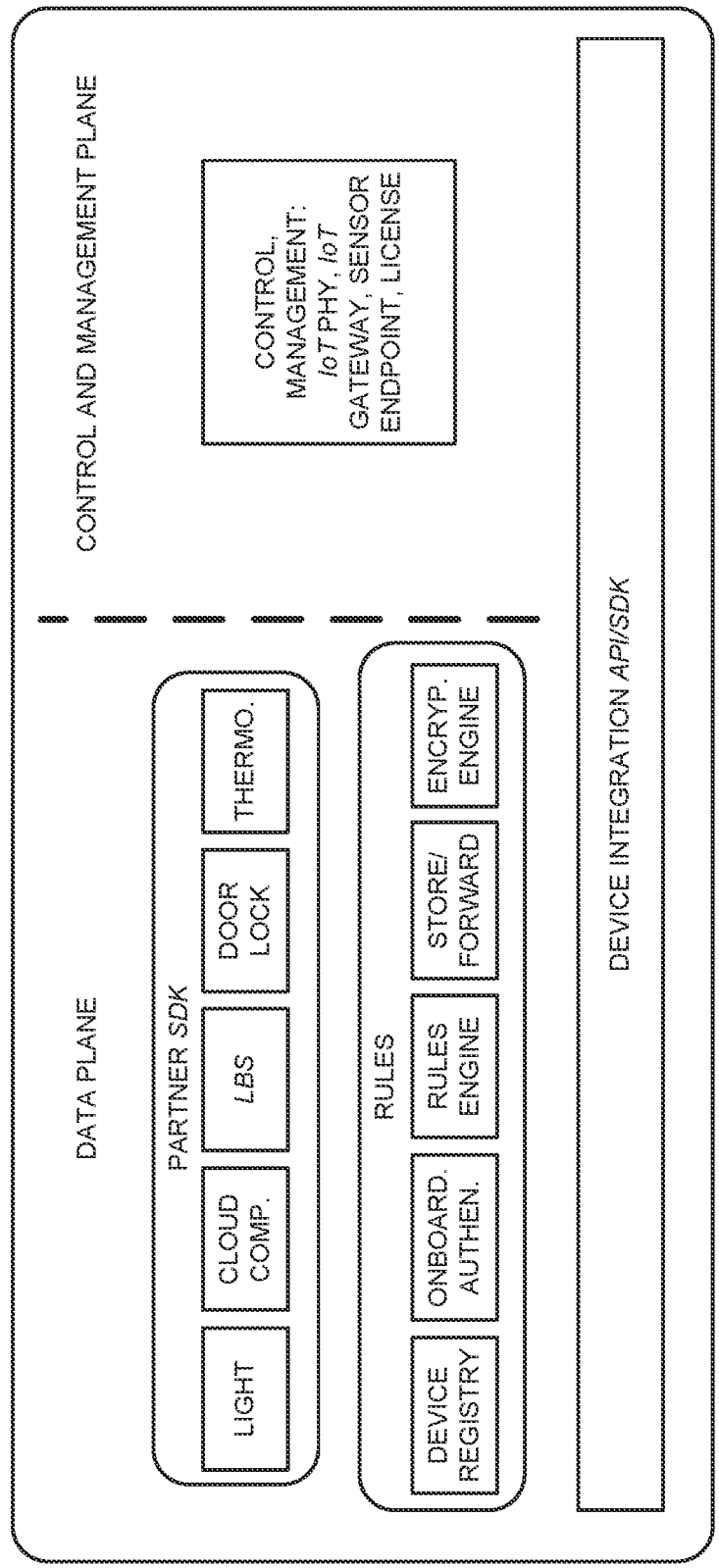
FIG. 3 is a block diagram illustrating an example of an Internet-of-Things (IoT) services manager of FIG. 1 in accordance with an embodiment of the present disclosure.
Figure 4:
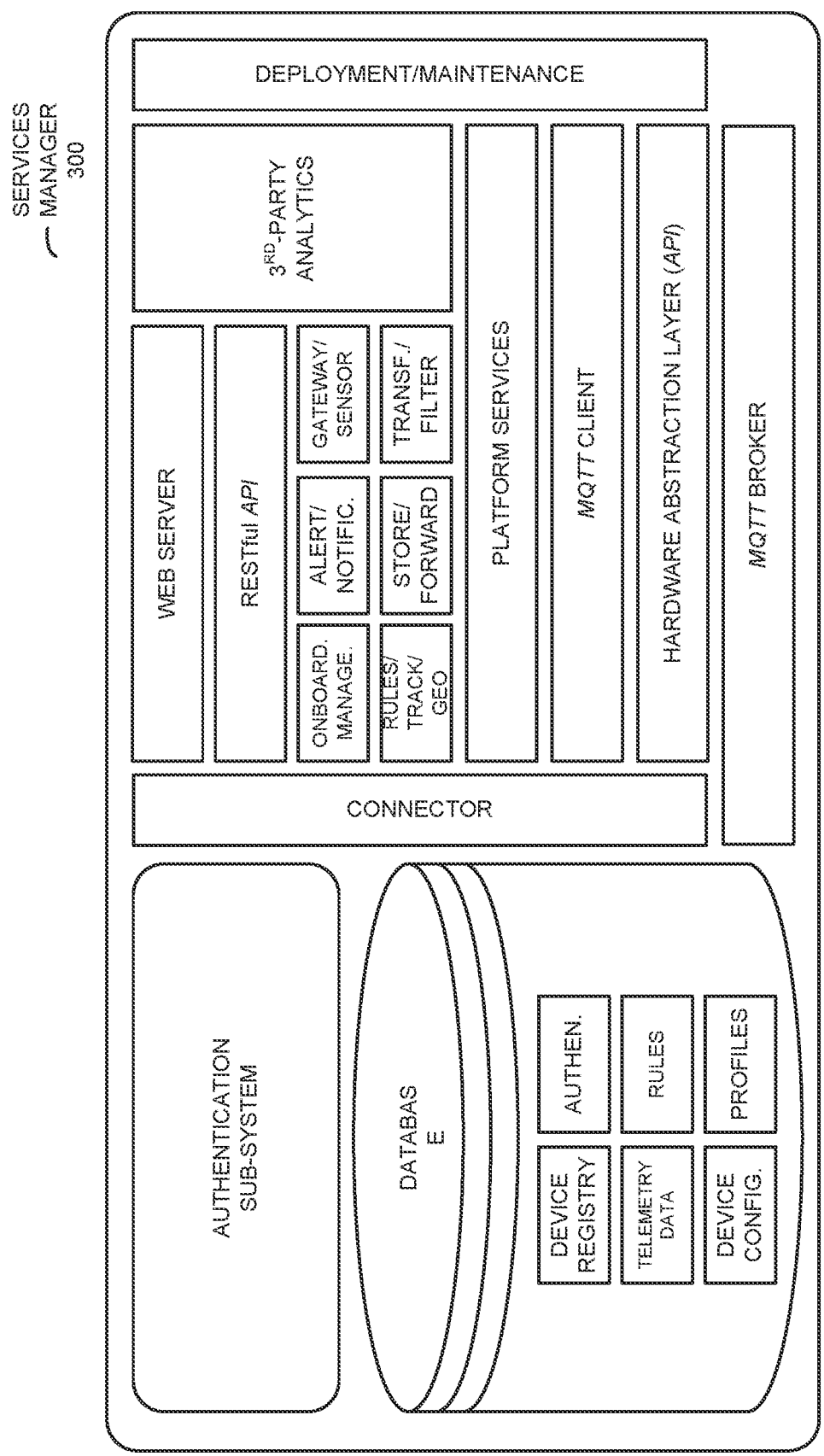
FIG. 4 is a block diagram illustrating an example of a software architecture of the services manager of FIGS. 1 and 3 in accordance with an embodiment of the present disclosure.

FIG. 3 presents a block diagram illustrating an example of a Virtual Internet-of-Things (VIoT) services manager 300, such as services manager 114 in FIG. 1. This services manager may include: a gateway that communicates with one or more access points 110 (FIG. 1) via a communication protocol (such as MQTT); a control and management plane with system-configuration information; and a data plane with a registry of the one or more of electronic devices 112 (FIG. 1), rules for the one or more of electronic devices 112, and APIs for service providers. Services manager 300 may provide a programmable, modular and integrated system for flexibly and securely exchanging data and associated services among access points 110, electronic devices 112, services manager 114 or 300, and computers 116 in FIG. 1. Moreover, resources in services manager 300 that are associated with different service providers may be contained in separate virtual machines. Alternatively or additionally, the resources from different service providers may be included in 'containers,' such as docker containers. Note that a docker container may be a lightweight, stand-alone, executable package of a piece of software that includes everything needed to run it: code, runtime, system tools, system libraries, and settings. The containerized software may run the same, regardless of the environment. Containers also may isolate software from its surroundings, such as differences between development and staging environments, and may help reduce conflicts between different software that is running on the same infrastructure.

As noted previously, services manager 300 may include a control and management plane. The control and management plane may include: control management, an IoT physical layer, a gateway (such as a gateway engine, control logic or module), an IoT-device endpoint, and/or associated licenses. In addition, the control and management plane may provide system-architecture configuration, such as: transmit power, Internet Protocol or IP addresses, etc.

Moreover, services manager 300 may include a data plane with a partner SDK (for applications/services such as: a door lock, a thermostat, a light, analytical services, location-based services or LBS, cloud-based computing, etc.). Furthermore, the data plane may include rules, such as: an electronic-device registry (which may include device-specific information in device profiles), a rules engine or module, onboarding, authentication, an encryption engine or control logic, and store and forward.

Services manager 300 may be a dual-stack, open-programmable, virtualized IoT device-management gateway platform. It may be highly customizable, deployable in multiple network topologies, and may be integrated with existing management networks.

The dual-stack, open-programmable, virtualized IoT-device-management gateway platform may be an enterprise-grade sensor-management platform. Note that services manager 300 may be a policy-driven virtualized wireless gateway that manages an IoT-device network that includes one or more types of IoT devices from one or more manufacturers, and which may use different communication protocols. The open framework may facilitate IoT-device-management in separate virtual machines, which may offer different vertical services.

In some embodiments, access point 200 (FIG. 2) and/or services manager 300 addresses a typical IoT-device-network management system, which may include: wireless IoT devices, a physical communication layer, a network connectivity/protocol layer, and/or a gateway layer. Notably, access point 200 (FIG. 2) may include a data acquisition layer. For example, a data acquisition engine or control logic may enable gateway communication at scale with many IoT devices using disparate IoT-device connectivity or communication protocols (such as BLE, Zigbee, Z-Wave, etc.). This data acquisition layer may include the drivers and metadata information used to recognize and communicate with the different IoT-device types using different communication protocols.

Moreover, access point 200 (FIG. 2) may include an aggregation and translation layer. Notably, many of the IoT-device connectivity or communication protocols are rudimentary and fragmented. For example, Zigbee or BLE often does not provide support for IP. The aggregation and translation layer may perform the function of normalizing the data collected across these devices. This block may perform packet processing and encapsulation functions for disparate incoming IoT-device packets and the output of this block may be normalized data in a standard format (such as MQTT) that is recognizable by a programmable application layer.

Furthermore, services manager 300 may include a programmable application layer. Notably, a smart-gateway abstraction service in services manager 300 may provide a full edge analysis engine or module. For example, the programmable application layer may implement blocks and functions, such as: a message broker, a rules engine or module, an onboarding engine or module, an electronic-device registry, a store and forward engine or module, and/or an encryption engine of control logic. Note that this layer may host a runtime environment and/or libraries that enable a third-party IoT SDKs, such as the partner service-provider SDKs. The routing of data packets to different third-parties may be based on predefined policies specified by a user, such as a customer or a service-provider partner.

Additionally, services manager 300 may include an open management interface layer.

Services manager 300 may be a self-contained virtual machine that includes APIs that enable customers and/or service-provider partners to add another layer of contextualization/customization based at least in part on specific business needs. This flexibility may make services manager 300 highly programmable and rapidly deployable.

Note that services manager 300 may be architected as a dual-stack gateway. A first stack may include the data acquisition layer and the aggregation and translation layer. As discussed previously, the first stack may physically reside in a wireless access point (such as access point 200 in FIG. 2) and/or in on-premise gateway hardware.

A second stack may include the programmable application layer and the open management interface layer. Note that the second stack is a virtual machine that can reside on any of the wireless gateway hardware, such as access point 200 (FIG. 2), controller 124 (FIG. 1), services manager 300. Thus, the second stack may be on-premise, in a data center or may be cloud-based. Therefore, in general functionality of access point 200 (FIG. 2) and/or services manager 300 may be implemented by an arbitrary component, such as a local or a distributed electronic device or system.

The dual-stack architecture may provide flexibility to be deployed in an arbitrary network topology. In addition, this architecture may enable a distributed gateway architecture.

The core functions of the solution (which is sometimes referred to as an 'IoT gateway') implemented in access point 200 (FIG. 2) and services manager 300 may include: centralized management (secure onboarding management of IoT devices and gateways), data aggregation (aggregate and transform data from multiple gateways), edge analytics (process data at the edge, i.e., behind the firewall, from multiple gateways), hardware abstraction (provide unified view/management of different IoT-device types), and/or rules and alerts (create rules and alerts, predictive analysis, etc.).

The technology and capabilities of the solution implemented in access point 200 (FIG. 2) and services manager 300 may include: self-contained container/virtual machine that can be hosted anywhere (such as a controller, a switch, in the cloud, etc.). Moreover, the solution may have multi-tenants, which provides flexible deployment models and allows the use of a public and/or a private cloud. Furthermore, the solution may have the ability to host $3^{rd}$-party SDKs and may provide a unified view of IoT devices/gateways. Additionally, the solution may incorporate edge computing capabilities (e.g., via a partner SDK and/or internal capability). The solution may be highly modular with a cloud-scale architecture.

In some embodiments, an open, programmable IoT gateway module may be programmed through a multitude of management platforms using one or more interfaces. Moreover, the IoT gateway may be capable of machine learning and intelligent decision making at the edge without back-hauling information to the cloud, e.g., intelligent channel selection and assignment of channels across disparate wireless radios (such as Zigbee, Bluetooth, BLE, Wi-Fi, LoRaWAN, etc.). Furthermore, the IoT gateway may automatically detect anomalies and may dynamically use rules for creation/insertion to suppress anomalies. In addition, the IoT gateway may provide notifications, intelligent tracking and geo fencing of IoT and IoT-device assets. Additionally, the IoT gateway may intelligently identity and classify electronic devices, e.g., learning electronic-device characteristics based on communication patterns, association patterns, and/or beaconing patterns. These characteristics may be used to assign traffic from an electronic device to a queue with an appropriate queue latency. The IoT gateway may also prioritize electronic devices and/or electronic-device categories based on the learned characteristics, which may be used to prioritization of messages and/or message categories. In some embodiments, the IoT gateway may guarantee delivery of certain IoT messages, such as based at least in part on prioritization, intelligent classification and/or machine learning FIG. 4 presents a block diagram illustrating an example of a software architecture of services manager 300. Notably, services manager 300 may include: an MQTT broker, a hardware abstraction layer API, an MQTT client, VIoT platform services (such as Java/Python runtime platform services), a gateway/IoT-device onboarding management, alerts/notifications, gateway/IoT-device actions, a rules engine/tracking/geo fencing, store and forward, and/or data transformation and filter. In addition, services manager 300 may include: $3^{rd}$-party edge analytics, a RESTful API (which uses HTTP requests to GET, PUT, POST and DELETE data) for provisioning, actuation, statistics aggregation and management, a web server, an authentication sub-system, and/or a database. The $3^{rd}$-party edge analytics may interface to external analytics services, the Web server may interface to one or more external cloud-based components, partner management portals, dashboard services and/or mobile applications. Note that the database may include information, such as: an electronic-device registry, telemetry data, electronic-device configuration, authentication, rules and/or profiles (e.g., electronic-device characteristics or device-specific information). In some embodiments, services manager 300 supports blockchain for highly secure environments.

Figure 5:
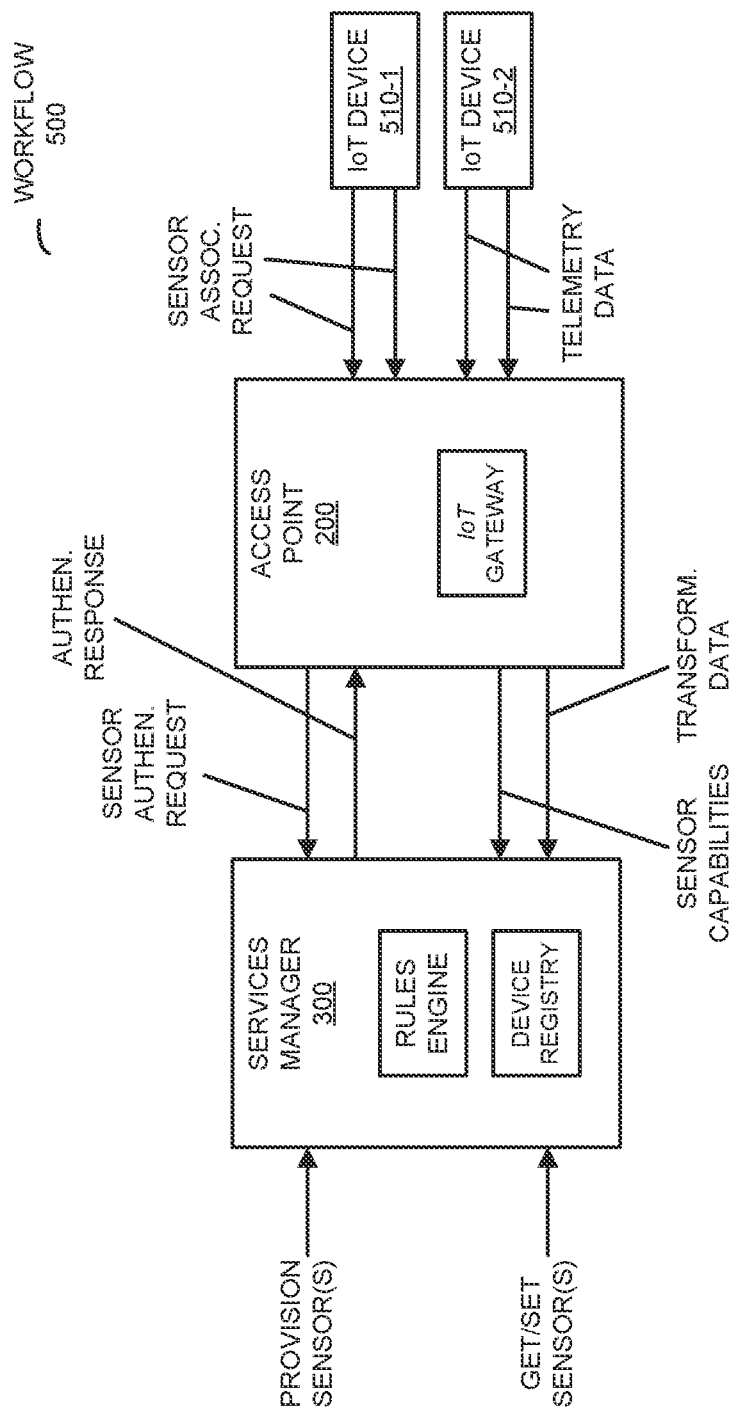
FIG. 5 is a drawing illustrating an example of an onboarding work flow in accordance with an embodiment of the present disclosure.

FIG. 5 presents a drawing illustrating an example of an onboarding work flow 500. Notably, IoT devices may be provisioned via an API call. Then, services manager 300 may create entry in an electronic-device registry. Moreover, one or more of IoT devices 510 may provide an IoT-device associate request to a gateway in access point 200. In response, access point 200 may provide an IoT-device authorization request to services manager 300, and may receive an authorization response. Next, access point 200 may provide information about IoT-device capabilities (and, more generally, characteristics of IoT devices 510). Furthermore, services manager 300 may receive an API call to get or set IoT devices, which may be forwarded to one or more of IoT devices 510. In response, one or more of IoT devices 510 (such as IoT device 510-2) may provide telemetry data. Associated transformed data may be provided by access point 200 to services manager 300. Additionally, services manager 300 may process the transformed data and/or may trigger local rules.

Figure 6:
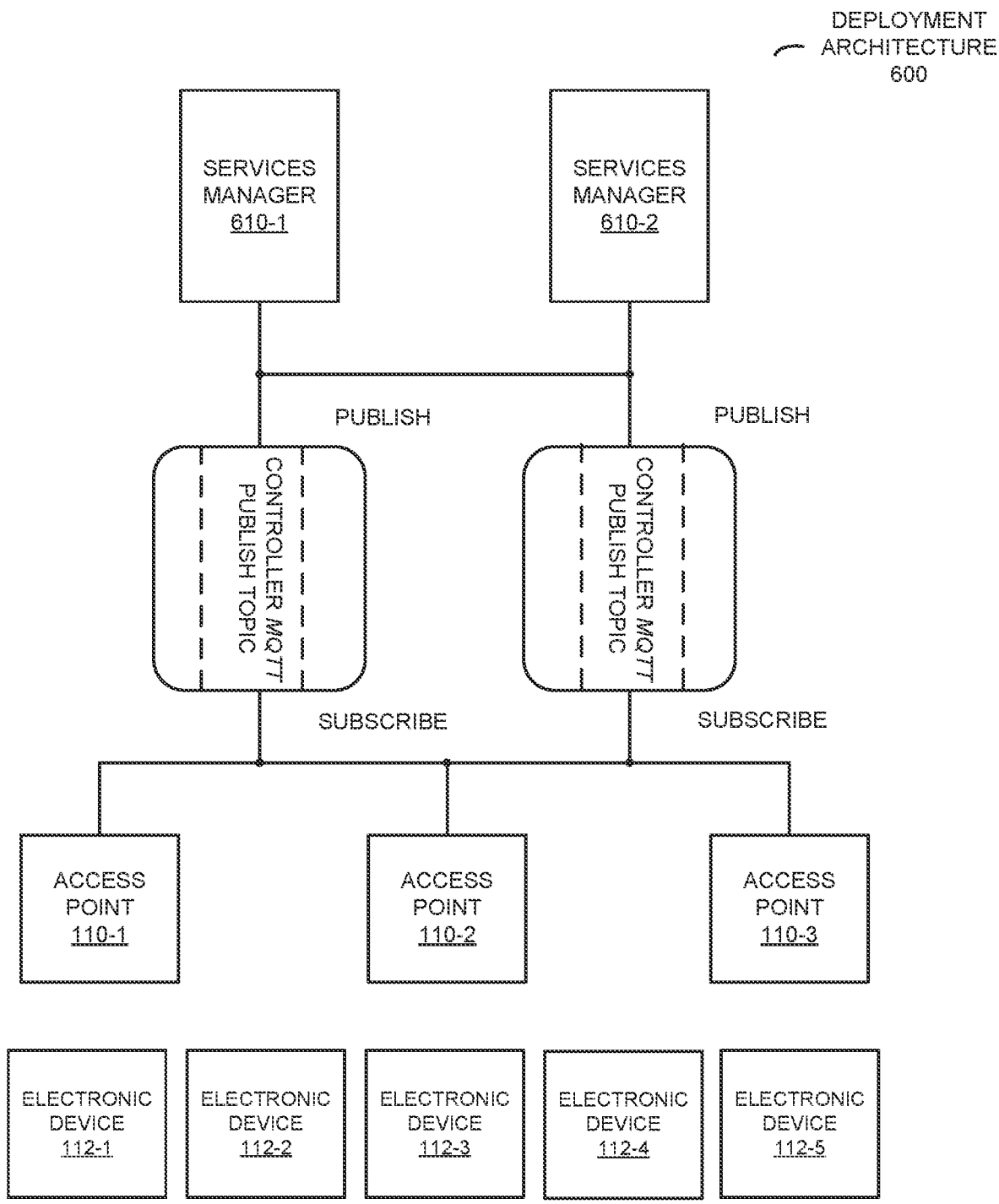
FIG. 6 is a drawing illustrating an example of a deployment architecture in accordance with an embodiment of the present disclosure.

FIG. 6 presents a drawing illustrating an example of a deployment architecture 600. This architecture may include: one or more IoT devices or electronic devices 112 (which may include one or more sensors or sensing capabilities), one or more access points 110 (or gateways), and one or more services managers 610. Services managers 610 may publish or subscribe messages via controller MQTT publish topics. For example, services managers 610 may publish or subscribe messages using channels (which may be static or dynamic) having associated priorities.

Note that a given services manager (such as services manager 610-1) may dynamically configure subdomains in access points 110 and/or electronic devices 112 (FIG. 1) to define a range of communication using a communication protocol, such as MQTT. Alternatively or additionally, the given services manager may dynamically define channels for data traffic with access points 110 and/or electronic devices 112, where the channels are associated with different, topics.

While the preceding embodiments illustrate access points 110 and services manager 114 as having particular components and a particular architecture, other embodiments may include fewer or more components, different components and/or a different architecture.

Figure 9:
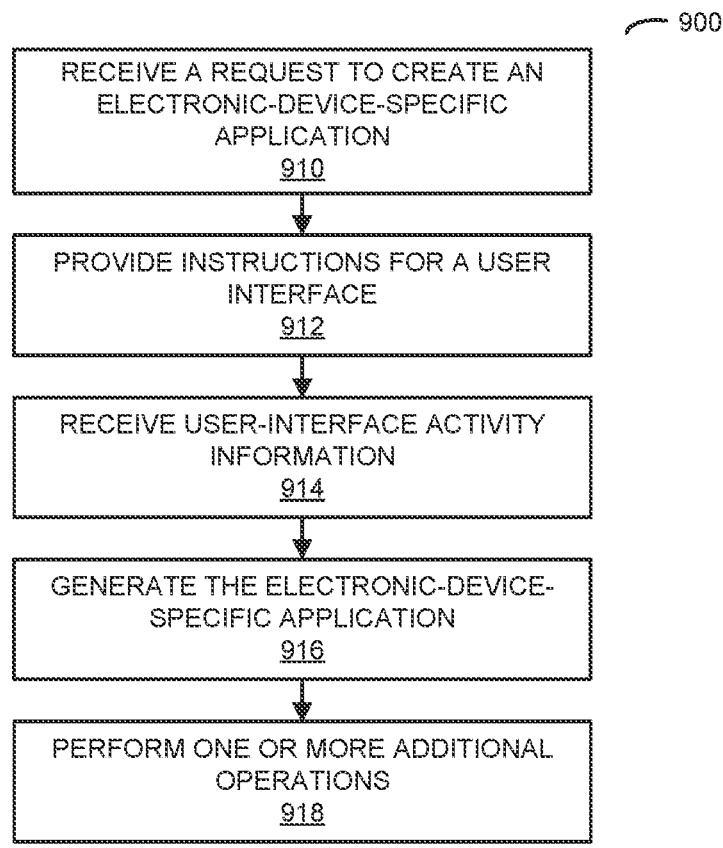
FIG. 9 is a flow diagram illustrating an example of a method for generating an electronic-device-specific application for use in the services manager in FIG. 1 in accordance with an embodiment of the present disclosure.

We now describe embodiments of methods associated with the configuration techniques. FIG. 9 presents a flow diagram illustrating an example of a method 900 for generating an electronic-device-specific application for use in the services manager, which may be performed by an electronic device, such as a computer 130 in FIG. 1. During operation, the electronic device may receive a request, from a second electronic device, to create the electronic-device-specific application (operation 910). In response to the request, the electronic device may provide, to the second electronic device, instructions for a user interface (operation 912), where the user interface is configured to present predefined configuration alternatives for the configuration parameters for the electronic-device-specific application and/or to receive inputs for the configuration parameters for the electronic-device-specific application.

For example, the predefined configuration alternatives for the configuration parameters for the electronic-device-specific application and/or the inputs for the configuration parameters for the electronic-device-specific application may include communication information, authentication information and/or security information. Notably, the predefined configuration alternatives for the configuration parameters for the electronic-device-specific application and/or the inputs for the configuration parameters for the electronic-device-specific application may include: registration information, a message format, a receive communication protocol for the electronic device, a transmit communication protocol for the electronic device, authentication information, and/or security information. Thus, the configuration parameters for the electronic-device-specific application may specify functions of the electronic-device-specific application at different layers in an OSI model, including at least a physical layer, a data link layer and/or a network layer.

Then, the electronic device may receive, from the second electronic device, user-interface activity information (operation 914), which specifies selections of the configuration parameters for the electronic-device-specific application from the predefined configuration alternatives and/or the inputs for the configuration parameters for the electronic-device-specific application. Moreover, based at least in part on the configuration parameters for the electronic-device-specific application, the electronic device may generate the electronic-device-specific application (operation 916). Note that the electronic-device-specific application may be used for or associated with a third electronic device, a type of third electronic device or a class of third electronic devices that includes the third electronic device.

In some embodiments, the electronic device may perform one or more optional additional operations (operation 918).

For example, the services manager may be included in a system hierarchy between a computer associated with a provider of a third electronic device (such as an IoT device) and a gateway (such as an access point or an eNodeB) that communicates with the third electronic device. Notably, the services manager may manage one or more different electronic devices (such as the third electronic device) associated with one or more different providers, and may establish communication between one or more third electronic devices (e.g., via the gateway) and one or more computers associated with the one or more providers (such as cloud-based computers).

After generating the electronic-device-specific application (operation 916), the electronic device may provide, to the second electronic device, the electronic-device-specific application. The services manager may install and execute the electronic-device-specific application in a provider-specific or an electronic-device-specific environment in the services manager. For example, the provider-specific or the electronic-device-specific environment may include a virtual operating system in a container in the services manager, and the electronic-device-specific application may be a plugin that executes in the container.

In some embodiments, the electronic-device-specific application may be defined by the available system resources, and may be mapped to pools matching the service-level-agreement requested from the configurator (such as a user or an operator) for a given container. A definition may configure the system resources used by the given container to match the requirements needed to satisfy a service level agreement, such as maximum packet latency under traffic of up to a specified number of packets per second, while satisfying, at the same time, the availability of the system resources in the underlying system so that it does not exceed the system resources of the underlying system that are shared by multiple containers. In this way, a service-level-agreement-enabled data-driven configurator can address system-resource scheduling. Note that, in some embodiments, the configurator can, at a configuration stage, guide a user or an operator to correctly distribute sets of finite-pool service-level-agreement-enabling system resources, so that the user or the operator can iteratively determine how to distribute these system resources end-to-end among the applications in order to achieve a desired solution with the correct service prioritizations in multiple dimensions.

Moreover, the configuration parameters for the electronic-device-specific application may be associated with different system resources (such as computational resources, memory, and/or network resources) or priorities in the services manager and/or the system hierarchy. For example, the electronic device may determine the system resources based at least in part on the configuration parameters for the electronic-device-specific application and/or a priority associated with the electronic-device-specific application. In some embodiments, the electronic devices may generate a service level agreement for a provider of the third electronic device based at least in part on the configuration parameters for the electronic-device-specific application, where the service level agreement specifies system resources corresponding to the configuration parameters for the electronic-device-specific application, performance of the electronic-device-specific application, and/or associated compensation for an operator of the services manager.

For example, the system resources may include distributing a finite set of time slots to a set of services and denying the addition of extra services when the set of time slots is exhausted. This approach may prioritize the service level agreement of a service by granting more time slots to a service with a higher service level agreement.

In some embodiments, the electronic device may provide feedback to an operator or a user if a set of parameters given cannot be satisfied by the electronic device, for example, if a finite resource needed for achieving a requested service level agreement and distributed to one or more applications has been exhausted.

Furthermore, electronic device may receive performance information (and, more generally, feedback) associated with operation of the electronic-device-specific application in at least a portion of the system hierarchy (e.g., from the services manager). Based at least in part on the performance information, the electronic device may (e.g., automatically or without human action) modify the configuration parameters for the electronic-device-specific application and may (e.g., automatically or without human action) regenerate the electronic-device-specific application. For example, if the performance information indicates that the electronic-device-specific application is not meeting a performance (such as a throughput, a latency, a capacity, etc.) and/or a priority associated with a service level agreement, the electronic device may change the configuration parameters (and/or allocated system resources). Furthermore, the electronic; device may modify the configuration parameters for the electronic-device-specific application based at least on predefined or predetermined electronic-device-specific information, e.g., information stored in a profile of the third electronic device, which includes attributes or characteristics of the third electronic device (such as one or more capabilities of the third electronic device, a type of the third electronic device, an operating system of the third electronic device, etc).

In some embodiments of method 900 there may be additional or fewer operations. Furthermore, the order of the operations may be changed, and/or two or more operations may be combined into a single operation.

Figure 10:
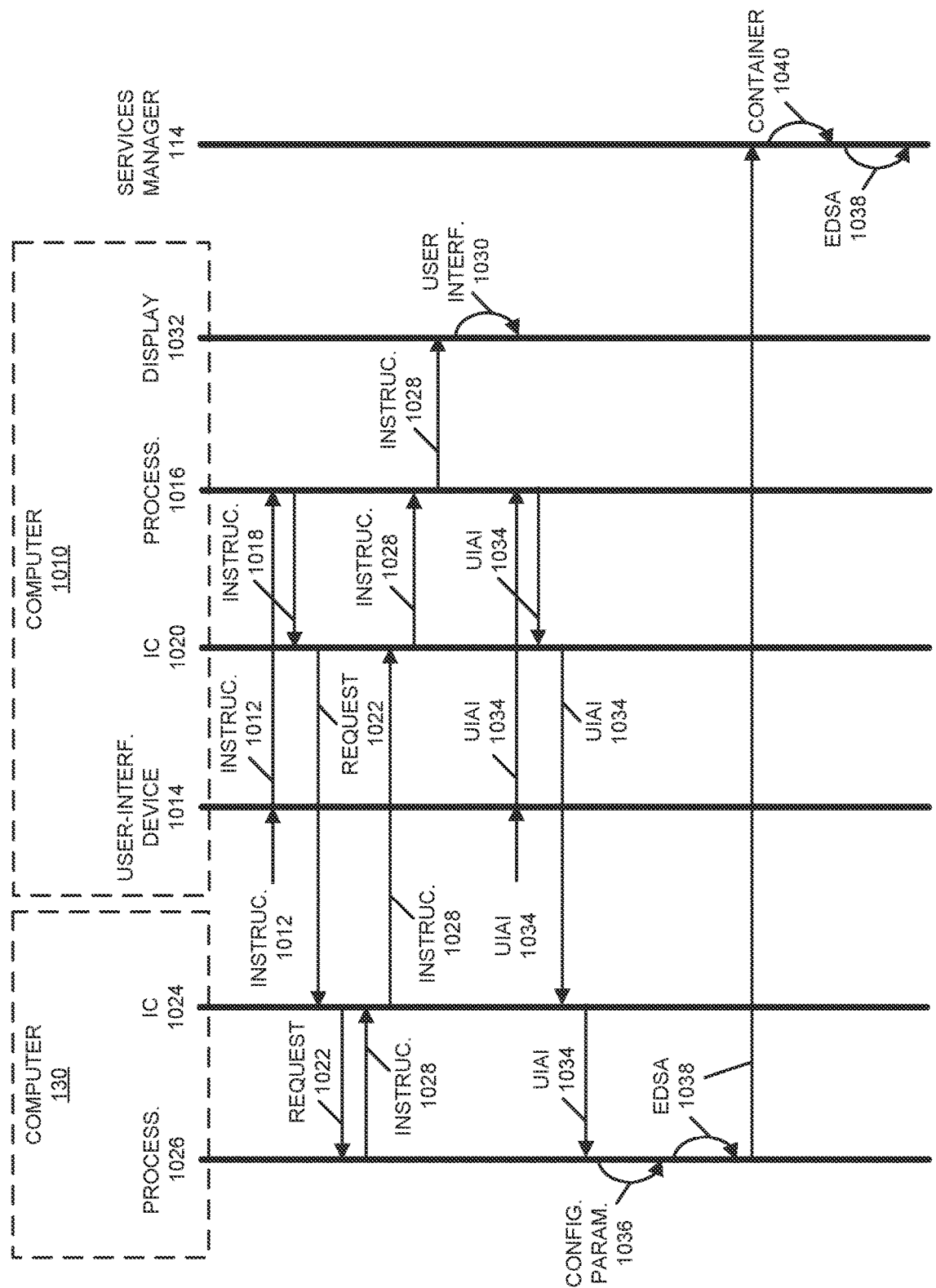
FIG. 10 is a drawing illustrating an example of communication among the electronic devices in FIG. 1 in accordance with an embodiment of the present disclosure.

Embodiments of the configuration techniques are further illustrated in FIG. 10, which presents a drawing illustrating an example of communication among computer 130, computer 1010 (which may be one of computers 116 in FIG. 1) and services manager 114. Notably, a user of computer 1010 may provide an instruction 1012 to create an electronic-device-specific application (EDSA) 1038 using a user-interface device 1014 in or associated with computer 1010 (such as a keyboard, a mouse, a touch-sensitive display, a voice-user interface, etc.). In response, processor 1016 in computer 1010 may instruct 1018 interface circuit (IC) 1020 in computer 1010 to provide a request 1022 to computer 130 to create the electronic-device-specific application 1038.

After receiving request 1022, interface circuit 1024 in computer 130 may provide request 1022 to processor 1026 in computer 130. Then, processor 1026 may provide instructions 1028 for a user interface 1030 to interface circuit 1024, which provides instructions 1028 (e.g., in one or more packets or frames) to computer 1010. When displayed by computer 1010, this user interface may present predefined configuration alternatives for configuration parameters for the electronic-device-specific application 1038 and/or to receive inputs for the configuration parameters for the electronic-device-specific application 1038.

Next, after receiving instructions 1028, interface circuit 1020 may provide them to processor 1016, which instructs display 1032 in computer 1010 to display under interface 1030.

Using user-interface device 1014, the user may provide user-interface activity information (UIAI) 1034, which specify selections of the configuration parameters 1036 for the electronic-device-specific application 1038 from the predefined configuration alternatives and/or the inputs for the configuration parameters 1036 for the electronic-device-specific application 1038. Processor 1016 may provide the user-interface activity information 1034 to interface circuit 1020, which may provide the user-interface activity information 1034 to computer 130 (e.g., in one or more packets or frames).

After receiving the user-interface activity information 1034, interface circuit 1024 may provide the user-interface activity information 1034 to processor 1026. Based at least in part on the configuration parameters 1036 for the electronic-device-specific application 1038, processor 1026 may generate the electronic-device-specific application 1038.

Then, processor 1026 may provide the electronic-device-specific application 1038 to interface circuit 1024, which may provide the electronic-device-specific application 1038 to services manager 114 (e.g., in one or more packets or frames). After receiving the electronic-device-specific application 1038, services manager 114 may create or establish a container 1040 that provides a provider-specific or an electronic-device-specific environment for the electronic-device-specific application 1038. Next, services manager 114 may install and execute the electronic-device-specific application 1038 in container 1040.

While FIG. 10 illustrates communication between components using unidirectional or bidirectional communication with lines having single arrows or double arrows, in general the communication in a given operation in this figure may involve unidirectional or bidirectional communication.

Figure 11:
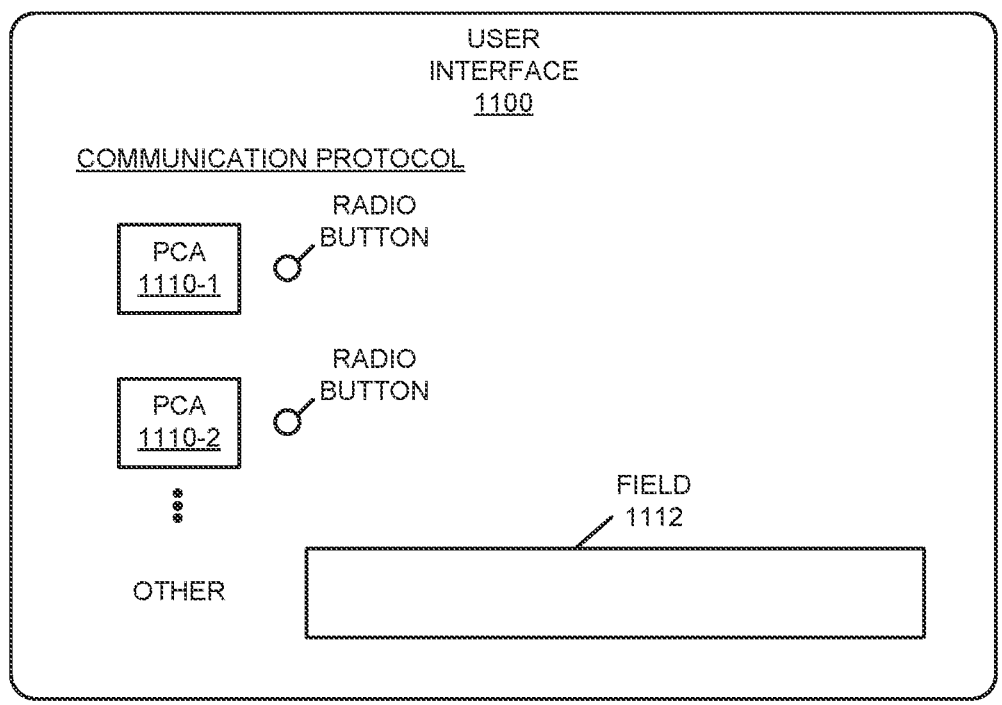
FIG. 11 is a drawing illustrating an example of a user interface in accordance with an embodiment of the present disclosure.

FIG. 11 presents a drawing illustrating an example of a user interface 1100 in accordance with an embodiment of the present disclosure. This user interface may include predefined configuration alternatives (PCAs) 1110 for configuration parameters for an electronic-device-specific application and/or fields (such as field 1112) to receive inputs for the configuration parameters for the electronic-device-specific application. For example, the predefined configuration alternatives 1110 may include one or more of: checkboxes, radio buttons, dropdown lists, list boxes, buttons and/or toggles. Moreover, the fields may include one or more text fields. Alternatively or additionally, inputs for the configuration parameters for the electronic-device-specific application may be provided via a voice-user interface and/or a haptic interface.

While the preceding embodiments illustrate user interface 1100 as having particular user-interface components and a particular architecture, other embodiments may include fewer or more user-interface components, different user-interface components and/or a different architecture.

In some embodiments, in order to provide vendor-extendability for partner infrastructure when creating an IoT system, partner infrastructure that can scale up and provide a short time-to-market delay, as well as without requiring frequent core-product releases, may be needed. Notably, partners may need to add their proprietary extension modules, e.g., software-implemented plugins, with minimal or no core-product development. Moreover, in order to support enterprise-grade vendor-extendability by vendors, extension modules may need to be dynamically loadable and they may need to be isolated from each other for security and for resource isolation. Notably, providing a dynamic IoT SDK and plugin infrastructure may require resource isolation for processing, data memory and storage, and communication resources. It may also require dynamic pluggability in shared IoT messaging channels, so that messages specific to the dynamically loaded vendor module may be automatically routed to the vendor module and only to the vendor module registering identification of the message.

In order to provide these capabilities, the IoT system may include: multiple IoT gateways (such as access points) connected to IoT end devices over multiple radio transport (e.g., ZigBee and BLE); an IoT controller (such as the services manager) to which IoT gateways in the system connect, which: manage the IoT features in the IoT gateways and the IoT end devices, their onboarding, commissioning state, and their capabilities and capability states. Moreover, the IoT controller may include a set of vendor-specific SDK modules that route vendor-specific IoT traffic to service end-points per each vendor. For example, the IoT system may route per-vendor traffic into the IoT controller SDK modules, based at least in part on vendor-code-based routing, over a common messaging channel. Note that each SDK module may have registered the vendor codes they support and may receive messages with those vendor codes. Furthermore, the IoT controller SDK modules may be dynamically be loaded and unloaded, with a mechanism that adds/removes vendor codes and additional information from a registrar. The IoT controller SDK modules may be containerized so that they do not consume the overall system resources more than that allocated for their containers. These mechanisms may include the use of docker-like technologies, or other techniques, such as cgroups kernel options in Linux, as well as the associated utilities.

Using these configuration techniques, vendor extension can scale much faster than when each vendor is hard-coded to the core system. Consequently, the configuration techniques may allow scaling up vendor-specific or cloud-service specific integrations to accelerate the pace at which new integrations can be added in terms of product life cycle time and engineering effort.

We now describe embodiments of an electronic device, which may perform at least some of the operations in the communication or the configuration techniques. FIG. 12 presents a block diagram illustrating an example of an electronic device 1200 in accordance with some embodiments, such as one of access points 110, electronic devices 112, services manager 114, computers 116 or computer 130. This electronic device includes processing subsystem 1210, memory subsystem 1212, and networking subsystem 1214. Processing subsystem 1210 includes one or more devices configured to perform computational operations. For example, processing subsystem 1210 can include one or more microprocessors, ASICs, microcontrollers, programmable-logic devices, one or more graphics processing units, and/or one or more digital signal processors (DSPs).

Memory subsystem 1212 includes one or more devices for storing data and/or instructions for processing subsystem 1210 and networking subsystem 1214. For example, memory subsystem 1212 can include dynamic random access memory (DRAM), static random access memory (SRAM), and/or other types of memory. In some embodiments, instructions for processing subsystem 1210 in memory subsystem 1212 include: one or more program modules or sets of instructions (such as program instructions 1222 or operating system 1224), which may be executed by processing subsystem 1210. Note that the one or more computer programs or program instructions may constitute a computer-program mechanism. Moreover, instructions in the various modules in memory subsystem 1212 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 1210.

In addition, memory subsystem 1212 can include mechanisms for controlling access to the memory. In some embodiments, memory subsystem 1212 includes a memory hierarchy that comprises one or more caches coupled to a memory in electronic device 1200. In some of these embodiments, one or more of the caches is located in processing subsystem 1210.

In some embodiments, memory subsystem 1212 is coupled to one or more high-capacity mass-storage devices (not shown). For example, memory subsystem 1212 can be coupled to a magnetic or optical drive, a solid-state drive, or another type of mass-storage device. In these embodiments, memory subsystem 1212 can be used by electronic device 1200 as fast-access storage for often-used data, while the mass-storage device is used to store less frequently used data.

Networking subsystem 1214 includes one or more devices configured to couple to and communicate on a wired and/or wireless network (i.e., to perform network operations), including: control logic 1216, an interface circuit 1218, an optional cable 1206 and one or more antennas 1220 (or antenna elements), which may be included in an optional antenna module 1230. (While FIG. 12 includes antenna module 1230, in some embodiments electronic device 1200 includes one or more nodes, such as nodes 1208, e.g., a pad, which can be coupled to antenna module 1230. Thus, electronic device 1200 may or may not include antenna modules 1230. Note that the one or more nodes 1208 may constitute input(s) to and/or output(s) from electronic device 1200.) For example, networking subsystem 1214 can include a Bluetooth™ networking system, a BLE networking system, a cellular networking system (e.g., a 3G/4G/5G network such as UNITS, LTE, etc.), a universal serial bus (USB) networking system, a networking system based on the standards described in IEEE 802.11 (e.g., a networking system), an Ethernet networking system, a Zigbee networking system, a Z-Wave networking system, a LoRaWAN networking system and/or another networking system.

Note that a transmit or receive antenna pattern (or antenna radiation pattern) of electronic device 1200 may be adapted or changed using pattern shapers (such as reflectors)one or more antennas 1220 (or antenna elements), which can be independently and selectively electrically coupled to ground to steer the transmit antenna pattern in different directions. Thus, if one or more antennas 1220 include N antenna pattern shapers, the one or more antennas may have $2^N$ different antenna pattern configurations. More generally, a given antenna pattern may include amplitudes and/or phases of signals that specify a direction of the main or primary lobe of the given antenna pattern, as well as so-called 'exclusion regions' or 'exclusion zones' (which are sometimes referred to as 'notches' or 'nulls'). Note that an exclusion zone of the given antenna pattern includes a low-intensity region of the given antenna pattern. While the intensity is not necessarily zero in the exclusion zone, it may be below a threshold, such as 3 dB or lower than the peak gain of the given antenna pattern. Thus, the given antenna pattern may include a local maximum (e.g., a primary beam) that directs gain in the direction of electronic device 1200 that is of interest, and one or more local minima that reduce gain in the direction of other electronic devices that are not of interest. In this way, the given antenna pattern may be selected so that communication that is undesirable (such as with the other electronic devices) is avoided to reduce or eliminate adverse effects, such as interference or crosstalk.

Networking subsystem 1214 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' or a 'connection' between the electronic devices does not yet exist. Therefore, electronic device 1200 may use the mechanisms in networking subsystem 1214 for performing simple wireless communication between the electronic devices, e.g., transmitting advertising or beacon frames and/or scanning for advertising frames transmitted by other electronic devices as described previously.

Within electronic device 1200, processing subsystem 1210, memory subsystem 1212, and networking subsystem 1214 are coupled together using bus 1228. Bus 1228 may include an electrical, optical, and/or electro-optical connection that the subsystems can use to communicate commands and data among one another. Although only one bus 1228 is shown for clarity, different embodiments can include a different number or configuration of electrical, optical, and/or electro-optical connections among the subsystems.

In some embodiments, electronic device 1200 includes a display subsystem 1226 for displaying information on a display, which may include a display driver and the display, such as a liquid-crystal display, a multi-touch touchscreen, etc.

Electronic device 1200 can be (or can be included in) any electronic device with at least one network interface. For example, electronic device 1200 can be (or can be included in): an IoT device, a desktop computer, a laptop computer, a subnotebook/netbook, a server, a tablet computer, a smartphone, a cellular telephone, a smartwatch, a consumer-electronic device, a portable computing device, an access point, a transceiver, a router, a switch, communication equipment, a controller, test equipment, and/or another electronic device.

Although specific components are used to describe electronic device 1200, in alternative embodiments, different components and/or subsystems may be present in electronic device 1200. For example, electronic device 1200 may include one or more additional processing subsystems, memory subsystems, networking subsystems, and/or display subsystems. Additionally, one or more of the subsystems may not be present in electronic device 1200. Moreover, in some embodiments, electronic device 1200 may include one or more additional subsystems that are not shown in FIG. 12. Also, although separate subsystems are shown in FIG. 12, in sonic embodiments some or all of a given subsystem or component can be integrated into one or more of the other subsystems or component(s) in electronic device 1200. For example, in some embodiments program instructions 1222 is included in operating system 1224 and/or control logic 1216 is included in interface circuit 1218.

Moreover, the circuits and components in electronic device 1200 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit (which is sometimes referred to as a 'communication circuit') may implement some or all of the functionality of networking subsystem 1214. The integrated circuit may include hardware and/or software mechanisms that are used for transmitting wireless signals from electronic device 1200 and receiving signals at electronic device 1200 from other electronic devices. Aside from the mechanisms herein described, radios are generally known in the art and hence are not described in detail. In general, networking subsystem 1214 and/or the integrated circuit can include any number of radios. Note that the radios in multiple-radio embodiments function in a similar way to the described single-radio embodiments.

In some embodiments, networking subsystem 1214 and/or the integrated circuit include a configuration mechanism (such as one or more hardware and/or software mechanisms) that configures the radio(s) to transmit and/or receive on a given communication channel (e.g., a given carrier frequency). For example, in sonic embodiments, the configuration mechanism can be used to switch the radio from monitoring and/or transmitting on a given communication channel to monitoring and/or transmitting on a different communication channel. (Note that 'monitoring' as used herein comprises receiving signals from other electronic devices and possibly performing one or more processing operations on the received signals)

In some embodiments, an output of a process for designing the integrated circuit, or a portion of the integrated circuit, which includes one or more of the circuits described herein may be a computer-readable medium such as, for example, a magnetic tape or an optical or magnetic disk. The computer-readable medium may be encoded with data structures or other information describing circuitry that may be physically instantiated as the integrated circuit or the portion of the integrated circuit. Although various formats may be used for such encoding, these data structures are commonly written in: Caltech Intermediate Format (CIF), Calma GDS II Stream Format (GDSII) or Electronic Design Interchange Format (EDIF). Those of skill in the art of integrated circuit design can develop such data structures from schematics of the type detailed above and the corresponding descriptions and encode the data structures on the computer-readable medium. Those of skill in the art of integrated circuit fabrication can use such encoded data to fabricate integrated circuits that include one or more of the circuits described herein.

While the preceding discussion used BLE, Ethernet, MQTT and a Wi-Fi communication protocols as illustrative examples, in other embodiments a wide variety of communication protocols and, more generally, wireless communication techniques may be used. Thus, the communication or configuration techniques may be used in a variety of network interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the communication or configuration techniques may be implemented using program instructions 1222, operating system 1224 (such as a driver for interface circuit 1218) or in firmware in interface circuit 1218. Note that the communication or configuration techniques may occur while processing system 1210 executes program instructions 1222. Thus, the communication or configuration techniques may be implemented at runtime of program instructions 1222. Alternatively or additionally, at least some of the operations in the communication or configuration techniques may be implemented in a physical layer, such as hardware in interface circuit 1218.

Moreover, while the preceding discussion illustrated embodiments of the communication or configuration techniques in which an access point transmits to or receives a frame or a packet from an electronic device, in some embodiments the access point may concurrently transmit to or receive frames or packets from two or more electronic devices. For example, the communication protocol in a WLAN may use orthogonal frequency division multiple access (OFDMA).

Furthermore, the functionality of electronic device 1200 may be implemented using a single electronic device or a group of electronic devices, which may be located at a single location or which may be distributed at disparate geographic locations (such as a cloud-based computing system).

In the preceding description, we refer to 'some embodiments.' Note that 'some embodiments' describes a subset of all of the possible embodiments, but does not always specify the same subset of embodiments. Moreover, note that numerical values in the preceding embodiments are illustrative examples of some embodiments. In other embodiments of the communication or configuration techniques, different numerical values may be used.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. A computer, comprising:
   one or more interface circuits configured to communicate with one or more computers associated with providers of second electronic devices and one or more gateways configured to communicate with the second electronic devices;
   a processor coupled to the one or more interface circuits; and
   memory, coupled to the processor, configured to store program instructions, wherein, when executed by the processor, the program instructions cause the electronic device to perform operations, comprising:
      establishing one or more separate containers with virtual environments for electronic-device-specific applications; and
      executing the electronic-device-specific applications in the corresponding one or more containers, wherein a given electronic-device-specific application executes in a given container, is associated with a given computer in the one or more computers, and is associated with: a given second electronic device in the second electronic devices, a type of the given second electronic device, or a class of a subset of the second electronic devices comprising the given second electronic device,
      wherein the given electronic-device-specific application comprises configuration parameters that specify functions in a physical layer, a data link layer and a network layer in the given electronic-device-specific application, wherein the configuration parameters comprise a message format of the given electronic-device-specific application, and wherein at least two of the electronic-device-specific applications have different message formats, and
      wherein the given container provides a provider-specific or an electronic-device-specific environment in the computer.

2. The computer of claim 1, wherein the one or more gateways comprise: an access point, or a radio node.

3. The computer of claim 1, wherein the provider-specific or the electronic-device-specific environment comprises a virtual operating system in the given container and the given electronic-device-specific application comprises a plugin that executes in the given container.

4. The computer of claim 1, wherein the configuration parameters comprise: communication information, authentication information and security information.

5. The computer of claim 4, wherein the communication information comprises: registration information, a receive communication protocol for the computer, a transmit communication protocol for the computer.

6. The computer of claim 1, wherein, based at least in part on the configuration parameters, the given electronic-device-specific application is configured to: provide instructions via the one or more gateways and addressed to the given second electronic device, the type of the given second electronic device, or the class of the subset of the second electronic devices; receive data via the one or more gateways and associated with the given second electronic device, the type of the given second electronic device, or the class of the subset of the second electronic devices; transform or analyze the data; and provide, addressed to the given computer, the transformed or analyzed data.

7. The computer of claim 1, wherein communication via the one or more gateways with the given second electronic device, the type of the given second electronic device, or the class of the subset of the second electronic devices is encrypted.

8. The computer of claim 1, wherein communication with the given second electronic device, the type of the given second electronic device, or the class of the subset of the second electronic devices uses a different communication protocol than communication with the given computer.

9. The computer of claim 1, wherein the operations comprise:
   receiving, at the one or more interface circuits, performance information associated with operation of the given electronic-device-specific application;
   modifying the configuration parameters of the given electronic-device-specific application based at least in part on the performance information; and
   regenerating the given electronic-device-specific application.

10. The computer of claim 9, wherein the modifying of the configuration parameters for the given electronic-device-specific application is based at least on attributes of the given second electronic device.

11. The computer of claim 1, wherein the operations comprise determining system resources based at least in part on the configuration parameters of the given electronic-device-specific application, a service level agreement associated with the given electronic-device-specific application, or both.

12. The computer of claim 11, wherein the service level agreement specifies a priority associated with the given electronic-device-specific application.

13. The computer of claim 1, wherein the operations comprise generating a service level agreement for a provider of the given second electronic device based at least in part on the configuration parameters for the given electronic-device-specific application; and
wherein the service level agreement specifies system resources corresponding to the configuration parameters for the given electronic-device-specific application, performance of the given electronic-device-specific application, and associated compensation for an operator of the computer.

14. A non-transitory computer-readable storage medium for use in conjunction with a computer, the computer-readable storage medium storing program instructions, wherein, when executed by the computer, the computer performs operations comprising:
establishing one or more separate containers with virtual environments for electronic-device-specific applications; and
executing the electronic-device-specific applications in the corresponding one or more containers, wherein a given electronic-device-specific application executes in a given container, is associated with a given computer in one or more computers associated with providers of second electronic devices, and is associated with: a given second electronic device in the second electronic devices, a type of the given second electronic device, or a class of a subset of the second electronic devices comprising the given second electronic device,
wherein the given electronic-device-specific application comprises configuration parameters that specify functions in a physical layer, a data link layer and a network layer in the given electronic-device-specific application, wherein the configuration parameters comprise a message format of the given electronic-device-specific application, and wherein at least two of the electronic-device-specific applications have different message formats,
wherein the given container provides a provider-specific or an electronic-device-specific environment in the computer, and
wherein the computer communicates with the second electronic devices via one or more gateways.

15. The non-transitory computer-readable storage medium of claim 14, wherein the provider-specific or the electronic-device-specific environment comprises a virtual operating system in the given container and the given electronic-device-specific application comprises a plugin that executes in the given container.

16. The non-transitory computer-readable storage medium of claim 14, wherein the operations comprise:
receiving performance information associated with operation of the given electronic-device-specific application;
modifying the configuration parameters of the given electronic-device-specific application based at least in part on the performance information; and
regenerating the given electronic-device-specific application.

17. A method for executing electronic-device-specific applications, comprising:
by a computer:
establishing one or more separate containers with virtual environments for the electronic-device-specific applications; and
executing the electronic-device-specific applications in the corresponding one or more containers, wherein a given electronic-device-specific application executes in a given container, is associated with a given computer in one or more computers associated with providers of second electronic devices, and is associated with: a given second electronic device in the second electronic devices, a type of the given second electronic device, or a class of a subset of the second electronic devices comprising the given second electronic device,
wherein the given electronic-device-specific application comprises configuration parameters that specify functions in a physical layer, a data link layer and a network layer in the given electronic-device-specific application, wherein the configuration parameters comprise a message format of the given electronic-device-specific application, and wherein at least two of the electronic-device-specific applications have different message formats,
wherein the given container provides a provider-specific or an electronic-device-specific environment in the computer, and
wherein the computer communicates with the second electronic devices via one or more gateways.

18. The method of claim 17, wherein the one or more gateways comprise: an access point, or a radio node.

19. The method of claim 17, wherein the provider-specific or the electronic-device-specific environment comprises a virtual operating system in the given container and the given electronic-device-specific application comprises a plugin that executes in the given container.

20. The method of claim 17, wherein the method comprises:
receiving performance information associated with operation of the given electronic-device-specific application;
modifying the configuration parameters of the given electronic-device-specific application based at least in part on the performance information; and
regenerating the given electronic-device-specific application.

* * * * *